US012638649B2

(12) United States Patent
Ghammam et al.

(10) Patent No.: US 12,638,649 B2
(45) Date of Patent: May 26, 2026

(54) ENCLOSURE AND FIBER OPTIC ORGANIZER INCLUDING ROTATING TRAYS

(71) Applicant: CommScope Technologies LLC, Hickory, NC (US)

(72) Inventors: El Moïz Mohammed Michel Ghammam, Brussels (BE); Geert Van Genechten, Vorselaar (BE); Bart Mattie Claessens, Hasselt (BE)

(73) Assignee: CommScope Technologies LLC, Hickory, NC (US)

( * ) Notice: Subject to any disclaimer, the term of this patent is extended or adjusted under 35 U.S.C. 154(b) by 187 days.

(21) Appl. No.: 18/549,825

(22) PCT Filed: Mar. 14, 2022

(86) PCT No.: PCT/US2022/020224
§ 371 (c)(1),
(2) Date: Sep. 8, 2023

(87) PCT Pub. No.: WO2022/192788
PCT Pub. Date: Sep. 15, 2022

(65) Prior Publication Data
US 2024/0184075 A1 Jun. 6, 2024

Related U.S. Application Data

(60) Provisional application No. 63/160,527, filed on Mar. 12, 2021.

(51) Int. Cl.
G02B 6/00 (2006.01)
G02B 6/44 (2006.01)
(52) U.S. Cl.
CPC ......... G02B 6/4455 (2013.01); G02B 6/4452 (2013.01)

(58) Field of Classification Search
CPC ................ G02B 6/4455; G02B 6/4452; G02B 6/4447; G02B 6/4454; G02B 6/00
See application file for complete search history.

(56) References Cited

U.S. PATENT DOCUMENTS

| | | | |
|---|---|---|---|
| 6,418,266 B1 | 7/2002 | Vitantonio | |
| 8,929,708 B2 * | 1/2015 | Pimentel | G02B 6/4454 385/135 |
| 9,140,870 B2 | 9/2015 | Marmon et al. | |

(Continued)

FOREIGN PATENT DOCUMENTS

| | | |
|---|---|---|
| EP | 2 490 057 B1 | 4/2017 |
| WO | 94/12904 A2 | 6/1994 |

(Continued)

OTHER PUBLICATIONS

FOSC 450 Fiber Optic Splice Closure Ordering Guide, Tyco Electronics Corporation, 26 pages (Copyright 2004).

(Continued)

*Primary Examiner* — Jennifer Doan
(74) *Attorney, Agent, or Firm* — Merchant & Gould P.C.

(57) ABSTRACT

Fiber management organizer assemblies of telecommunications closures. The assemblies include a base, a main body, a basket for holding portions of optical fibers and a fiber management tray support structure that pivotally supports fiber management trays. The basket mounts to the main body with a snap feature. The basket is mountable in two positions, a forward position, and an oppositely facing reverse position. The main body mounts to the base with a snap feature, including a spring loaded plunger, and a slidable engagement feature including a surrounding lip. The trays and the main body include a slidable locking feature for holding one or more trays in a rotated position away from lower structure of the organizer.

20 Claims, 27 Drawing Sheets

(56) References Cited

U.S. PATENT DOCUMENTS

| 10,649,167 | B2 | 5/2020 | Cornelissen et al. |
| 11,275,226 | B2 | 3/2022 | Claessens et al. |
| 11,487,071 | B2 | 11/2022 | Wittmeier et al. |
| 2006/0147173 | A1 | 7/2006 | Womack et al. |
| 2007/0047895 | A1* | 3/2007 | Parikh .................. H02G 15/013 |
| | | | 385/134 |
| 2020/0049916 | A1 | 2/2020 | Aznag et al. |
| 2020/0081217 | A1 | 3/2020 | Allen |
| 2020/0150370 | A1* | 5/2020 | Van Baelen ......... G02B 6/4452 |
| 2021/0011239 | A1 | 1/2021 | Geens et al. |
| 2022/0007089 | A1 | 1/2022 | Claessens et al. |
| 2022/0397735 | A1 | 12/2022 | Courchaine et al. |

FOREIGN PATENT DOCUMENTS

| WO | 00/63734 | A1 | 10/2000 |
| WO | 02/097488 | A2 | 12/2002 |
| WO | 2012/019936 | A1 | 2/2012 |
| WO | 2013/149846 | A1 | 10/2013 |
| WO | 2019/212887 | A1 | 11/2019 |
| WO | 2019/222148 | A2 | 11/2019 |
| WO | 2020/205572 | A1 | 10/2020 |
| WO | 2021/011541 | A1 | 1/2021 |
| WO | 2021/072025 | A1 | 4/2021 |
| WO | 2021/243277 | A1 | 12/2021 |
| WO | 2022/093621 | A1 | 5/2022 |

OTHER PUBLICATIONS

FOSC ACC D Basket and D Basket Tall Installation Instruction For use with FOSC 400 D Splice Closures, CommScope, Inc., 2 pages (Copyright 1999, 2000, 2008, 2009, 2016).

International Search Report and Written Opinion for Application No. PCT/US2022/020224 mailed Jun. 27, 2022.

* cited by examiner

*FIG. 14*
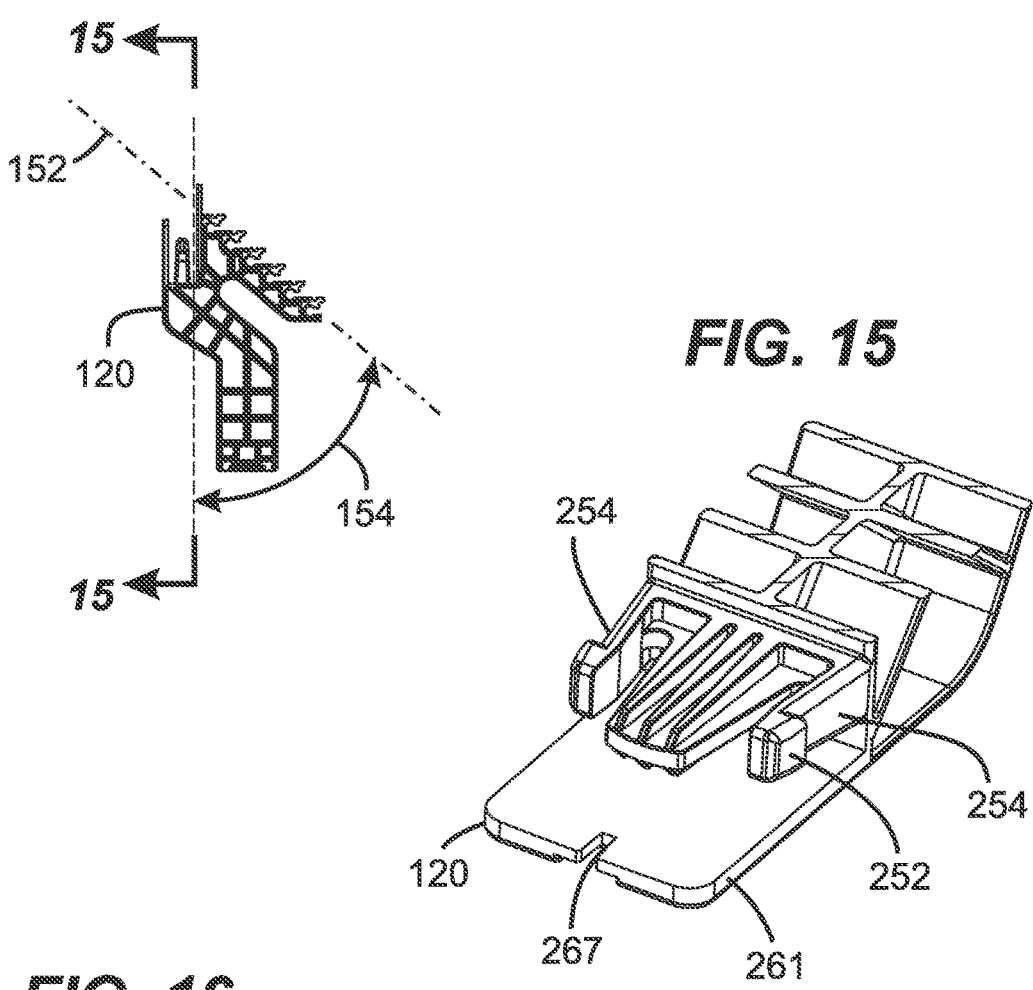
*FIG. 15*
*FIG. 16*
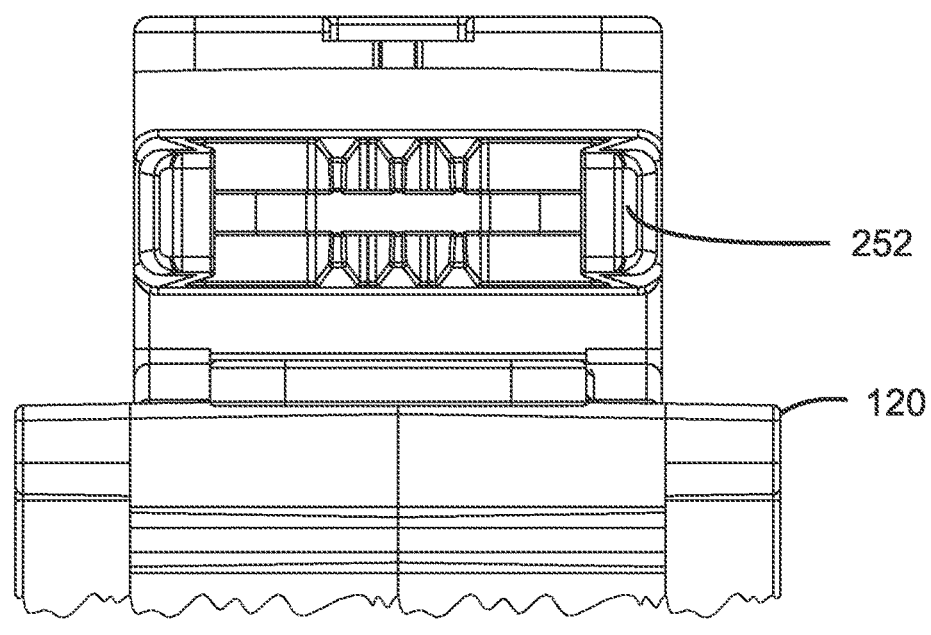

FIG. 18
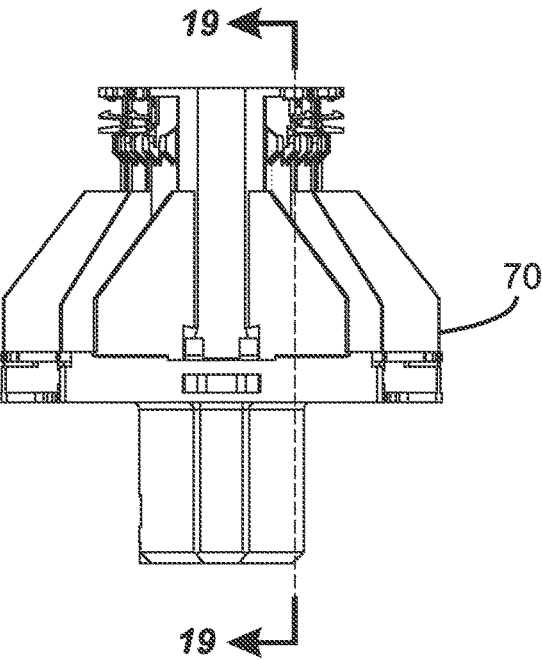
70
FIG. 19
290
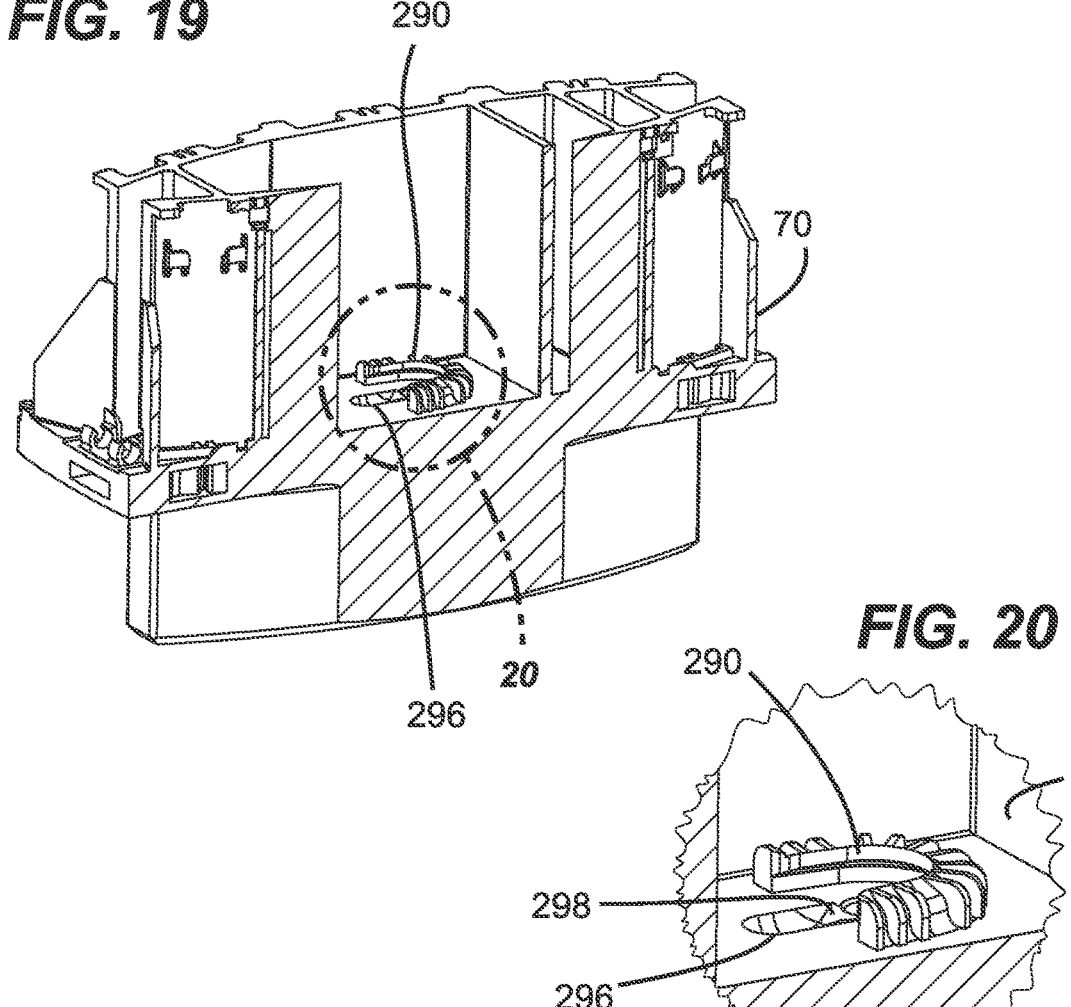
70
296
20
FIG. 20
290
70
298
296

FIG. 22
FIG. 23
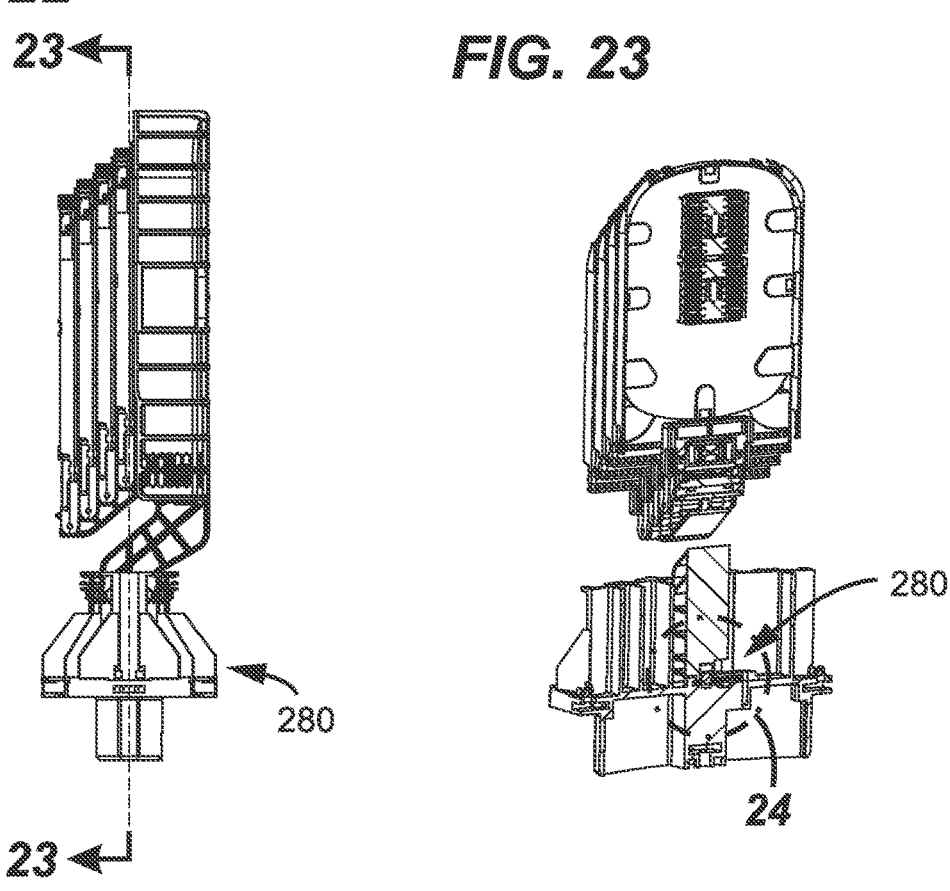
FIG. 24
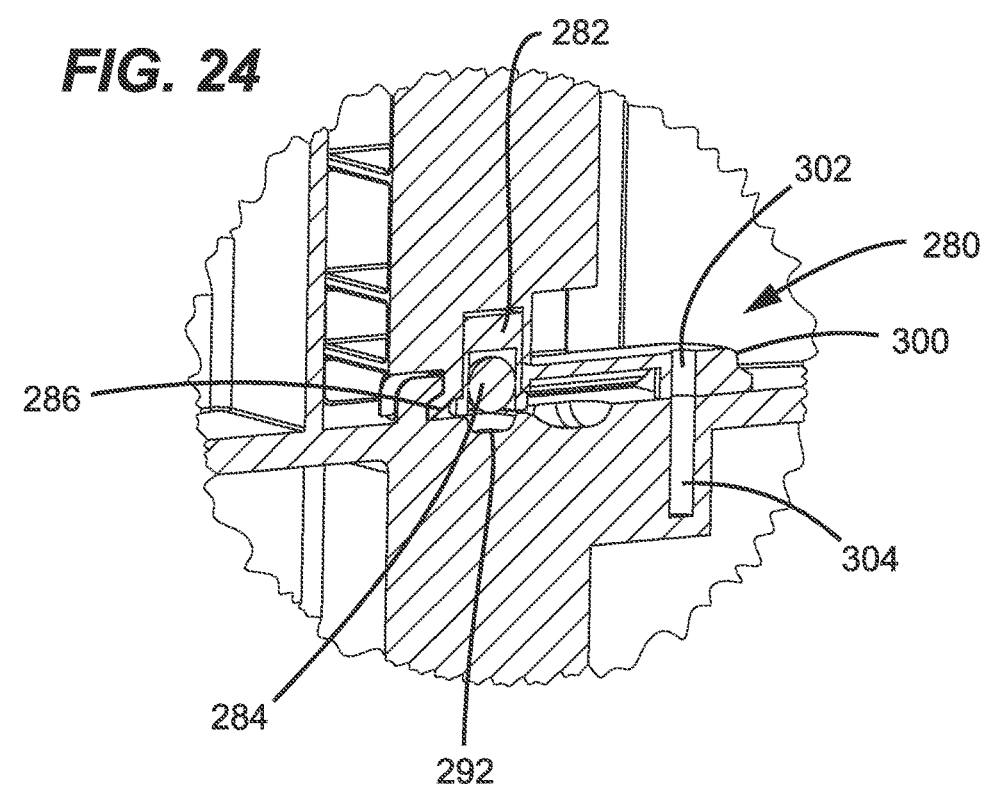

FIG. 33
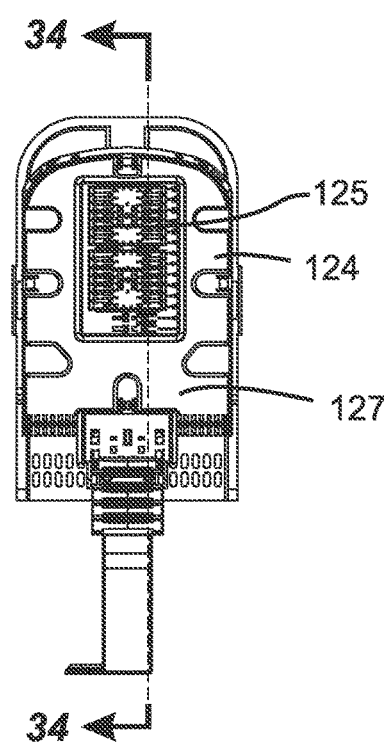
FIG. 34
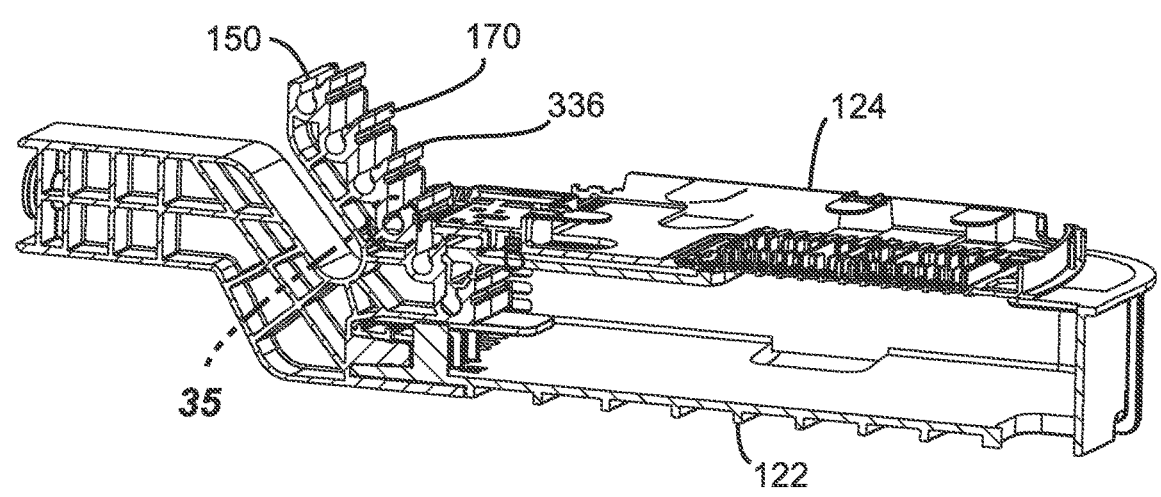
FIG. 35

*FIG. 42*
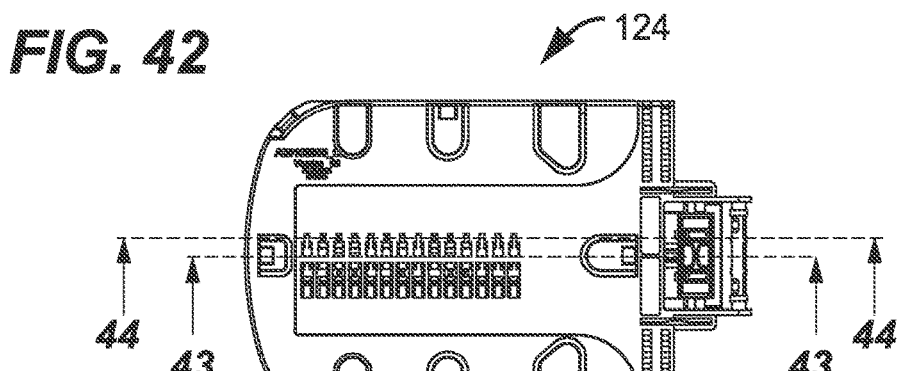
*FIG. 43*
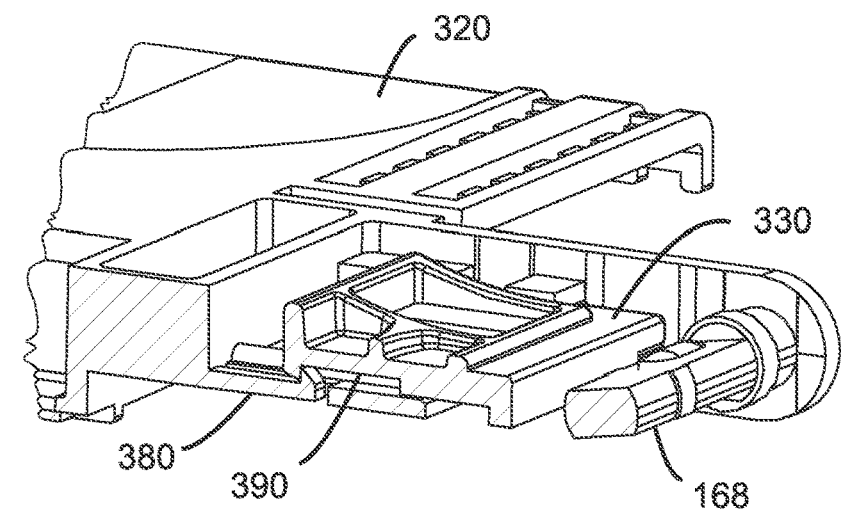
*FIG. 44*

ENCLOSURE AND FIBER OPTIC ORGANIZER INCLUDING ROTATING TRAYS

CROSS-REFERENCE TO RELATED APPLICATION

This application is a National Stage Application of PCT/US2022/020224, filed on Mar. 14, 2022, which claims the benefit of U.S. Patent Application Ser. No. 63/160,527, filed on Mar. 12, 2021, the disclosures of which are incorporated herein by reference in their entireties. To the extent appropriate, a claim of priority is made to each of the above disclosed applications.

TECHNICAL FIELD

The present disclosure relates to telecommunications enclosures, and more particularly to features of fiber organizer assemblies housed in telecommunications closures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures (or "closures") are adapted to house and protect telecommunications components such as splices, termination panels, power splitters, wave division multiplexers, fiber management trays, cable organizing, fiber routing components, etc.

Typically, telecommunications closures house a fiber organizing assembly having equipment for organizing fibers, storing fibers, and optically connecting provider side fibers to subscriber side fibers. A given closure can accommodate different types of optical connections between fibers, such as connector to connector connections and fiber splices.

SUMMARY OF THE INVENTION

In general terms, the present disclosure is directed to improvements in fiber management equipment of fiber management organizers of telecommunications closures.

In one aspect, the present disclosure is directed to an improved telecommunications closure.

In another aspect, the present disclosure is directed to an improved fiber management organizer of a telecommunications closure.

In one example, the fiber management organizer includes a main body, a fiber storage basket and fiber management trays. In one example, the main body holds rotatable fiber management trays.

In one aspect of the present disclosure, the basket is mountable to the main body with a snap feature. In one example embodiment, the basket is mountable in two positions, a forward position, and an oppositely facing reverse position.

In a further aspect of the disclosure, the main body mounts to a base of the closure with a snap feature. In one example embodiment, the snap feature includes a spring loaded plunger, and a slidable engagement feature including a surrounding lip.

A still further aspect of the present disclosure relates to the main body being configured for holding rotatable trays wherein the trays and the main body include a locking feature for holding one or more trays in a rotated position away from lower structure of the organizer including further trays, a basket, or other structure. The locking feature includes a slidable locking member.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 14 is a side view of the main body of the organizer.

FIG. 15 shows an enlarged cross-sectional perspective view of the snap of main body, taken along lines 15-15 of FIG. 14.

FIG. 16 is an end view of the snap of the main body.

FIG. 18 is a side view of the base of FIG. 7.

FIG. 19 is a cross-sectional perspective view of the base taken along lines 19-19 of FIG. 18.

FIG. 20 is an enlarged view of the interface area of the base of FIG. 19.

FIG. 22 is a side view of the organizer and base of FIG. 7.

FIG. 23 is a cross-sectional perspective view showing the main body mounted to the base, taken along lines 23-23 of FIG. 22.

FIG. 24 is an enlarged view of the interface area between the main body and the base of FIG. 23.

FIGS. 33-38 are further views of the organizer and tray of FIG. 25.

FIGS. 39-44 are further views of the organizer and tray of FIGS. 26-28.

DETAILED DESCRIPTION

Figure 1:
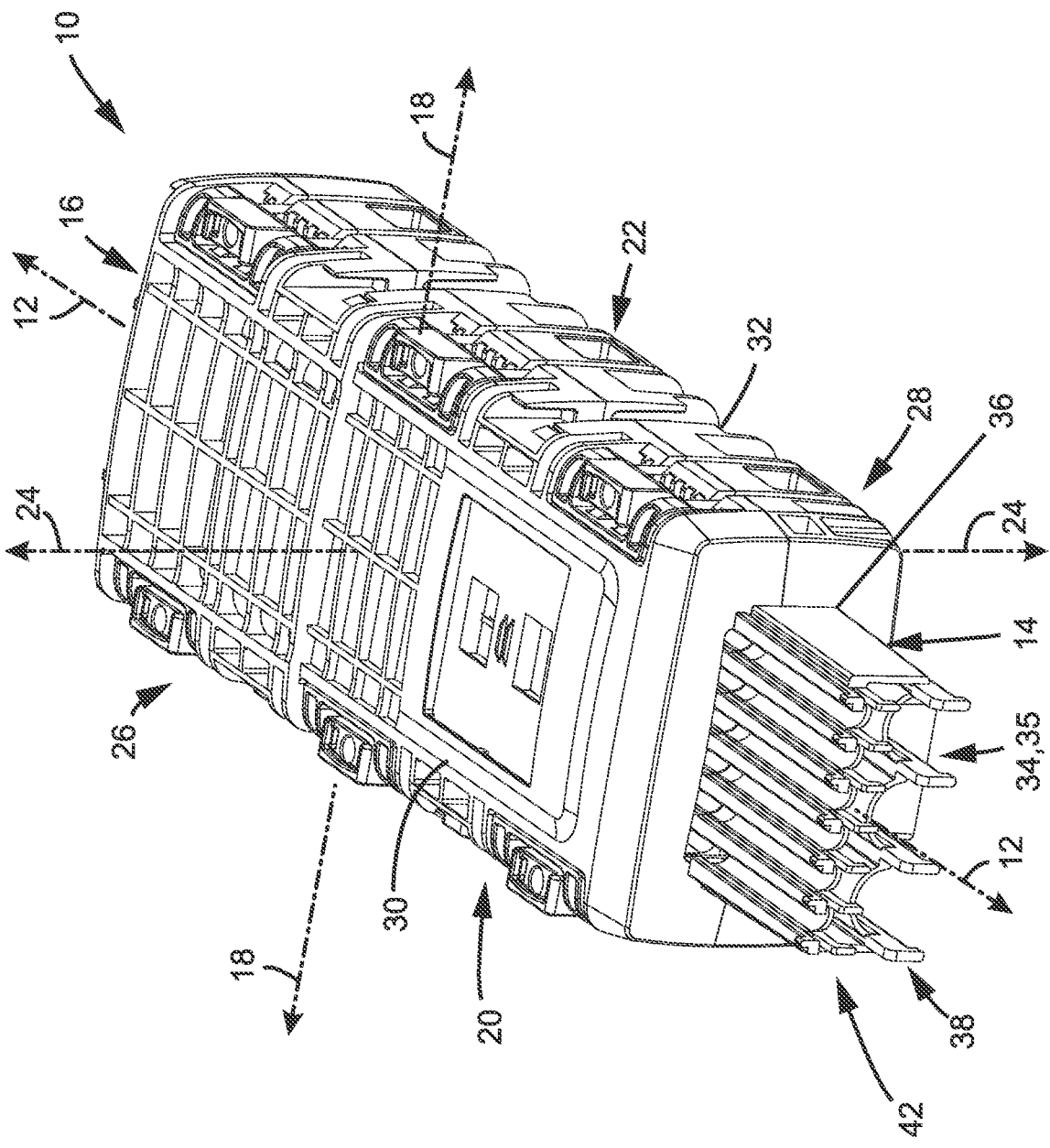
FIG. 1 is a perspective view of a telecommunications closure in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
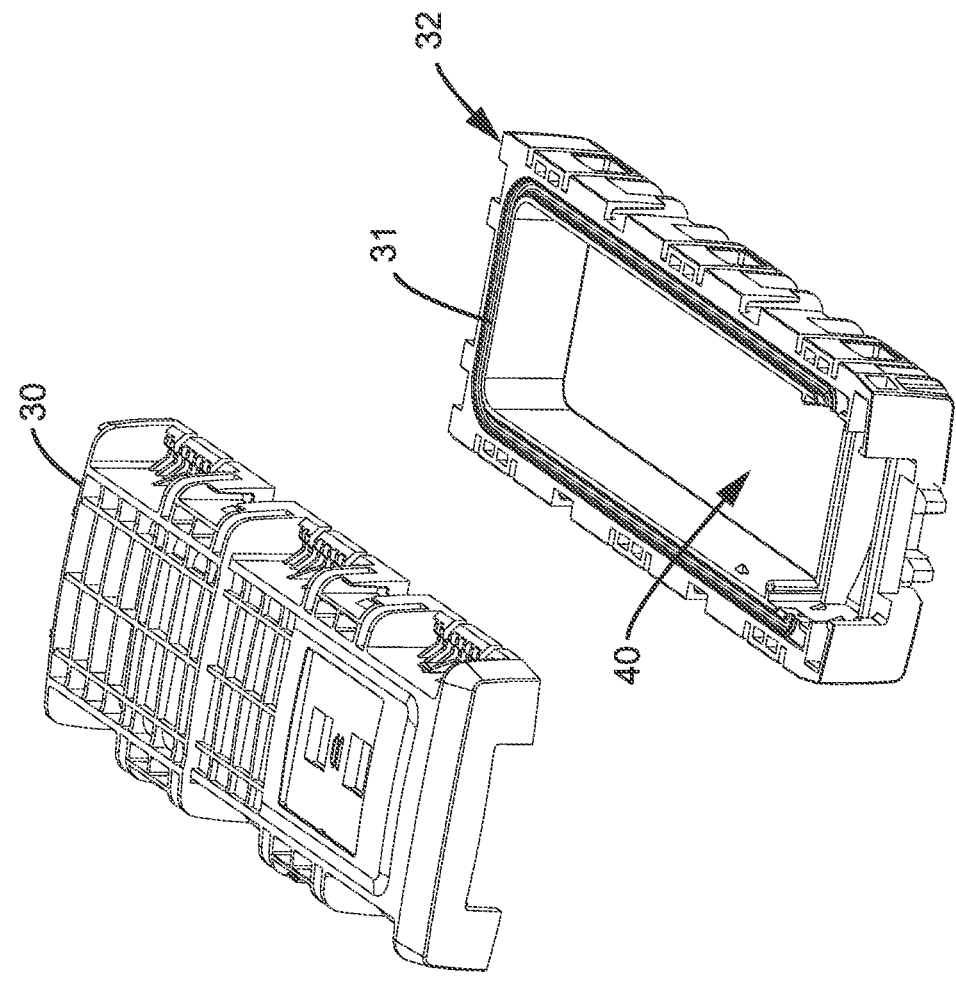
FIG. 2 is a perspective view of the housing pieces of the closure of FIG. 1.
Figure 3:
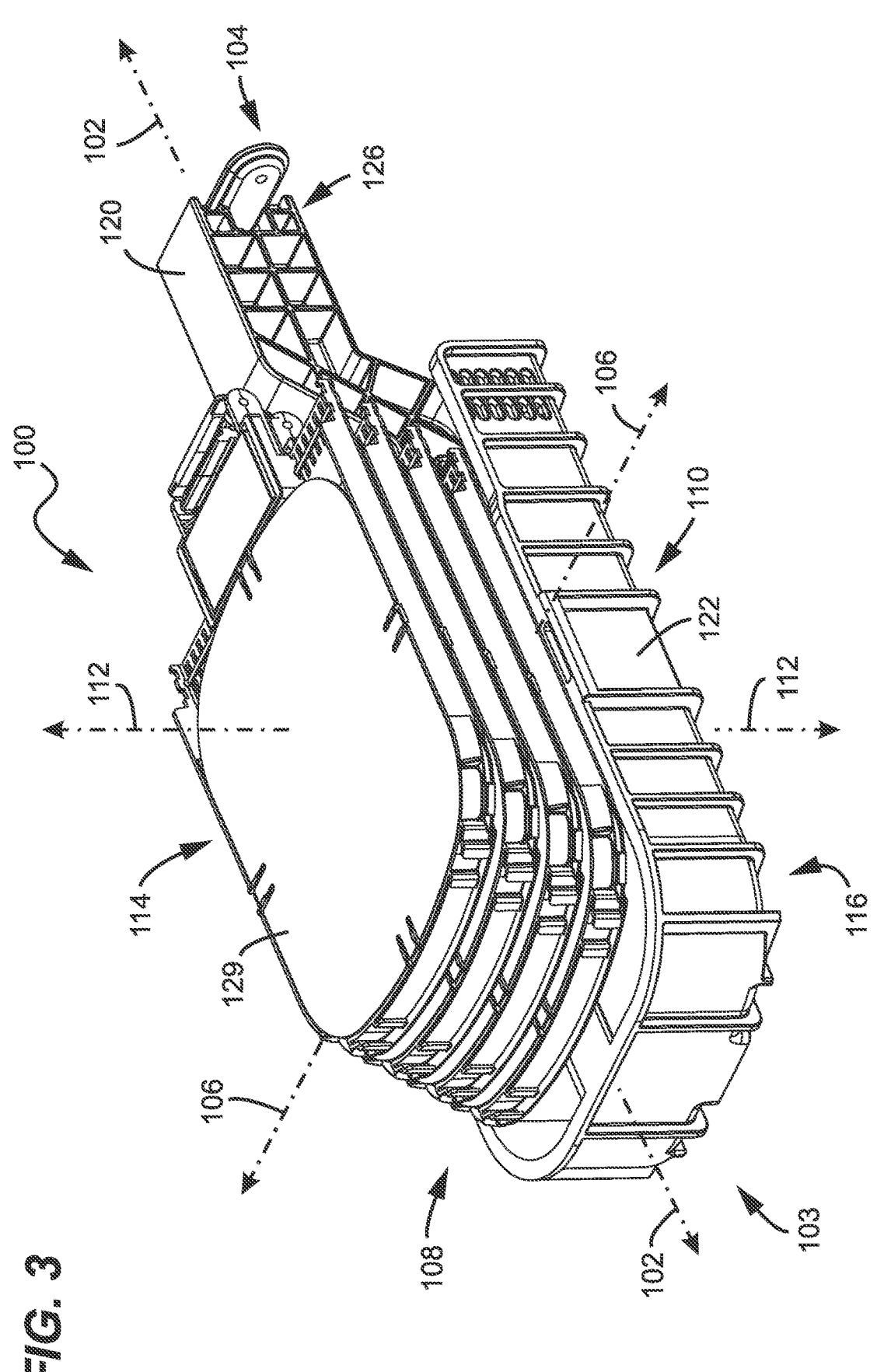
FIG. 3 is a perspective view of an optical fiber management organizer according to the present disclosure.
Figure 4:
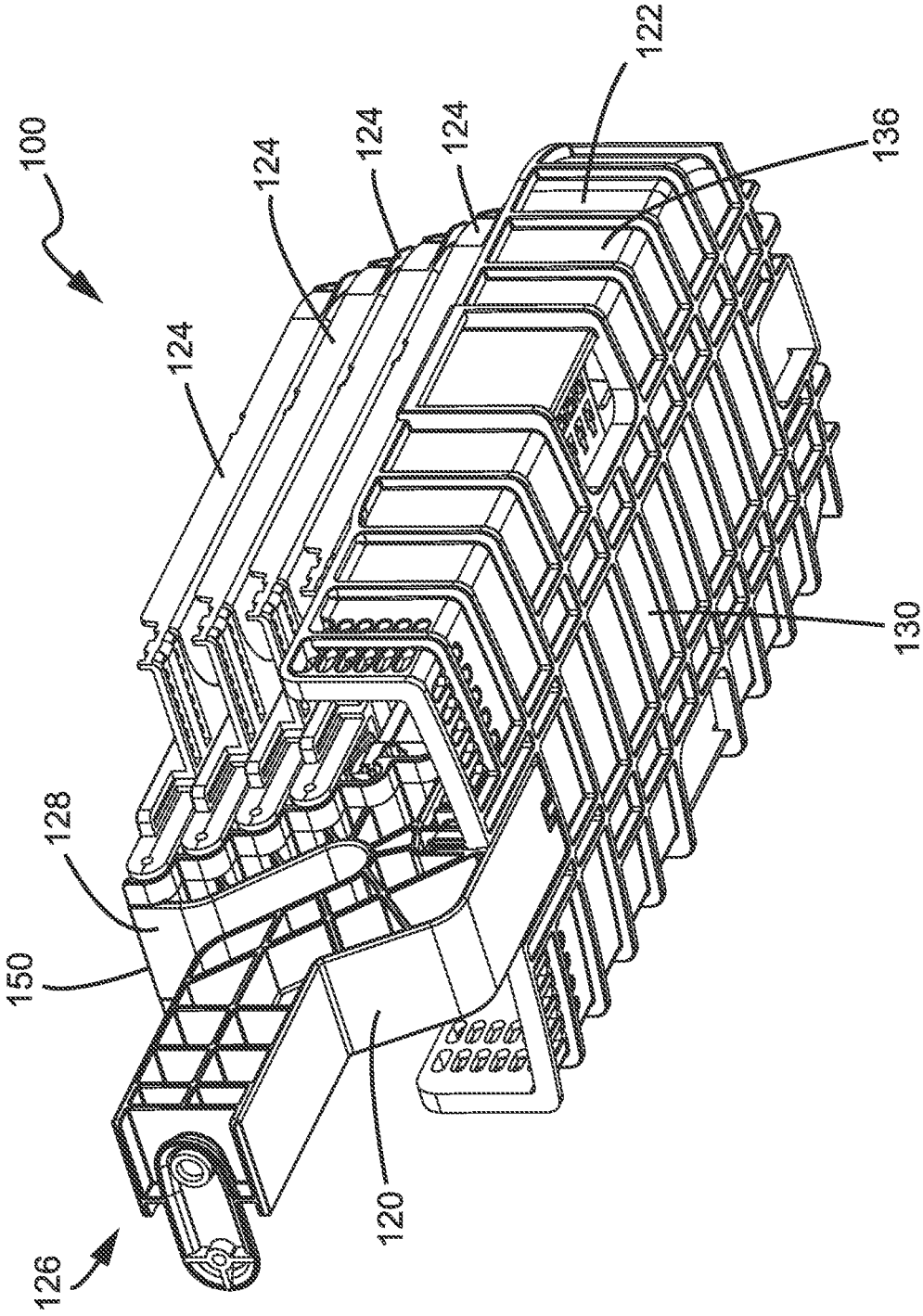
FIG. 4 is a further perspective view of the organizer of FIG. 3.
Figure 5:
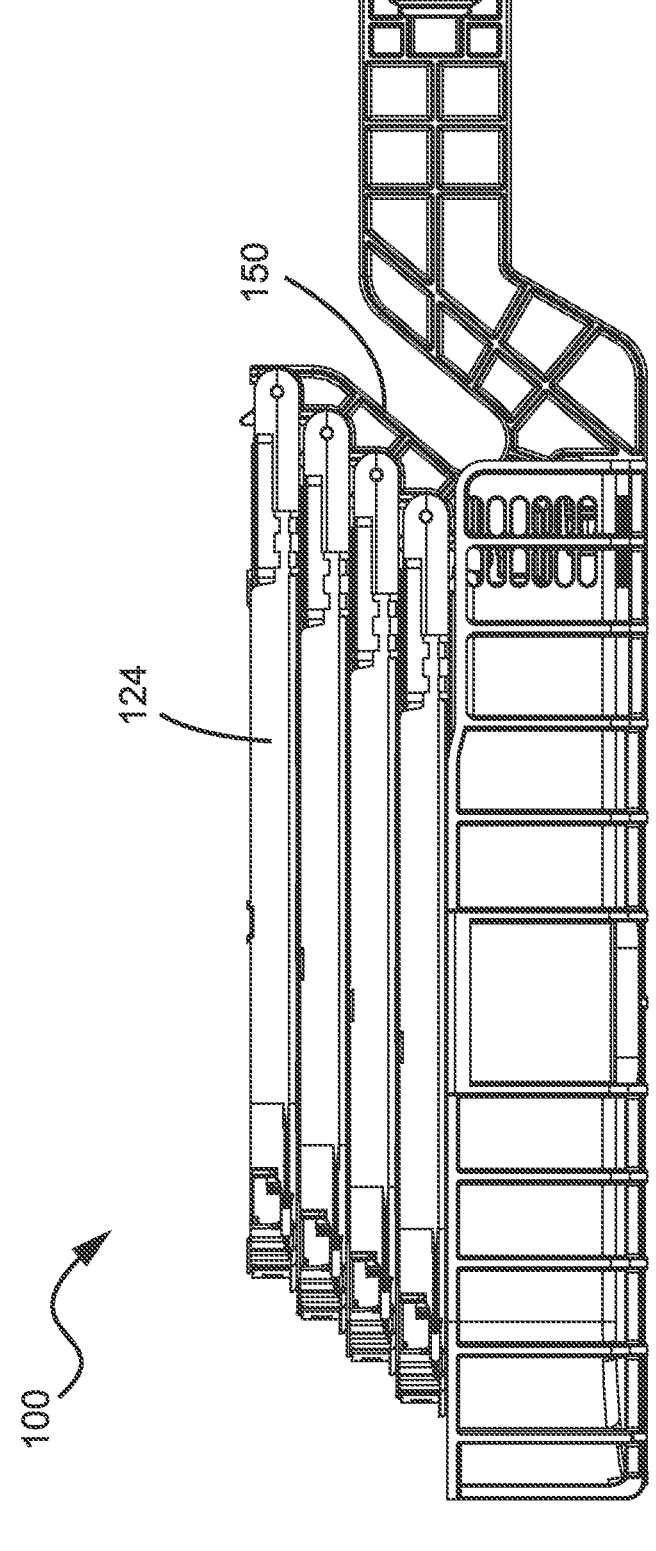
FIG. 5 is a side view of the organizer of FIG. 3.
Figure 6:
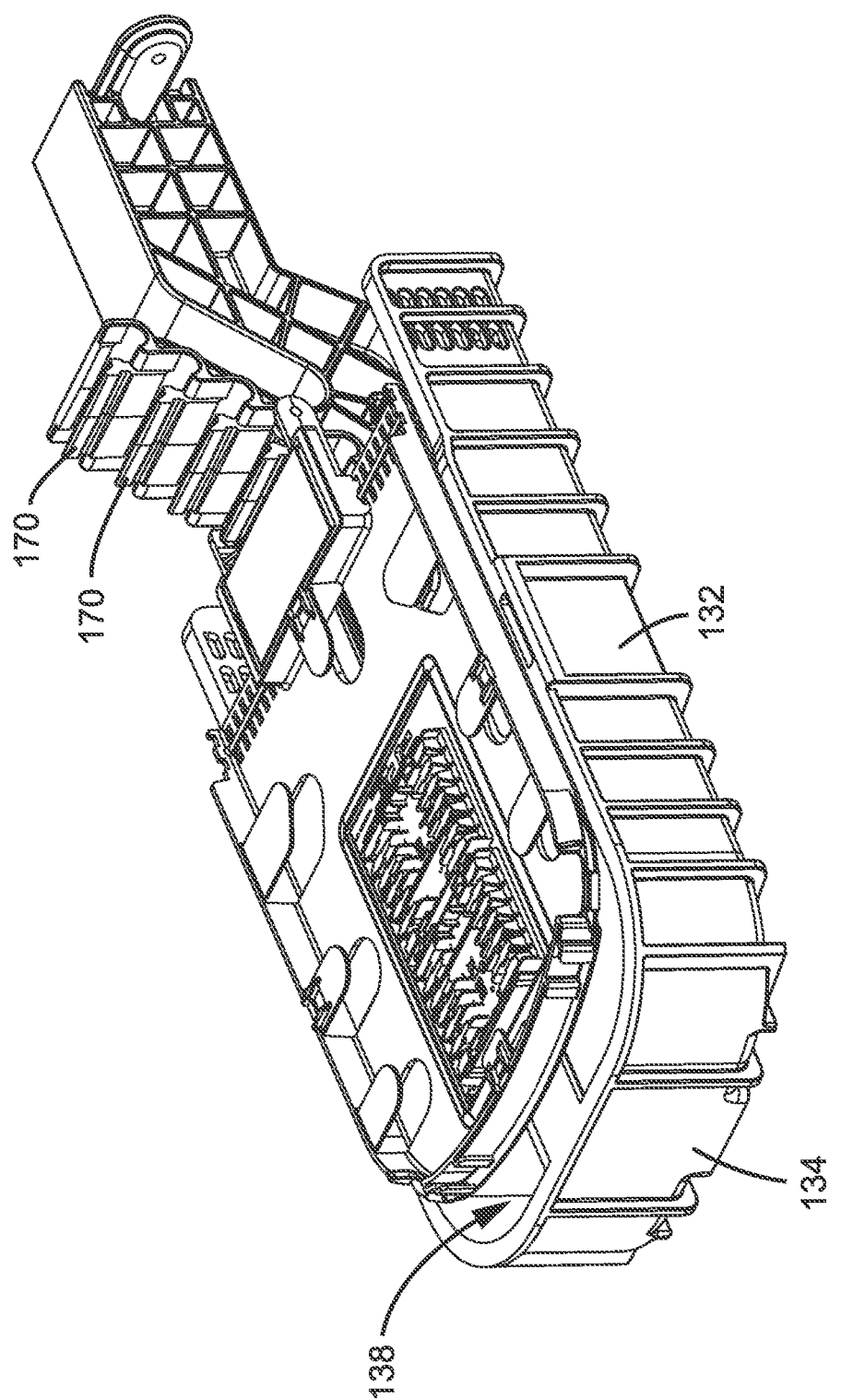
FIG. 6 is a perspective view of a portion of the organizer of FIG. 3.
Figure 7:
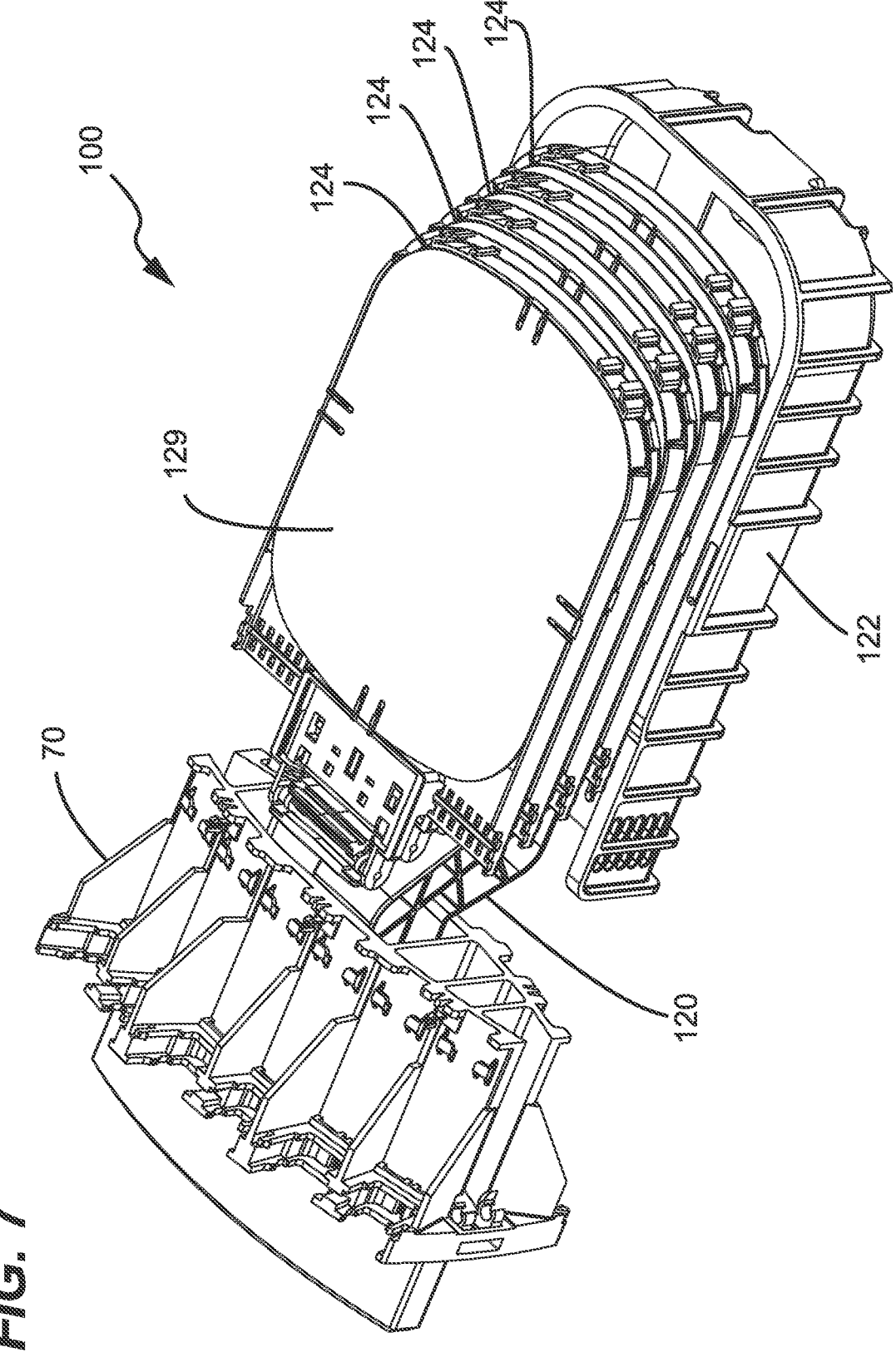
FIG. 7 is a perspective view of the organizer of FIGS. 3-6 mounted to a base of the closure.

Referring to FIGS. 1 and 2, a telecommunications closure 10 extends along a longitudinal axis 12 between a proximal end 14 and a distal end 16. The closure 10 extends along a transverse axis 18 between a first side 20 and a second side 22. The closure 10 extends along a vertical axis 24 between a top 26 and a bottom 28. The axes 12, 18 and 24 are mutually perpendicular, with the axes 12 and 18 defining a horizontal plane.

As used herein, terms such as proximal, distal, top, bottom, upper, lower, vertical, horizontal and so forth will be used with reference to the axes 12, 18, and 24 of FIG. 1 and in relating the positions of one component to another with respect to the full closure assembly of FIG. 1. These relative terms are for case of description only, and do not limit how the closure 10 or any individual component or combination of components, may be oriented in practice.

The closure 10 includes a first upper housing piece 30 and a second lower housing piece 32 that cooperate (e.g., with hinges, clamps, etc.) to form a sealable and re-enterable closure volume 40. A perimeter seal element 31 forms a seal about three sides of the closure volume 40 when the closure 10 is in sealed and closed configuration.

The closure volume 40 is configured to house a fiber management organizer 34. Cables enter the closure volume 40 via the opening 36 and sealed cable ports defined by the internal portion of the cable organizer 34.

The cable organizer 34 is configured to accommodate relatively thick cables (such as feeder cables and branch cables) entering the closure 10 via a lower region 38 of the cable organizer 34, and relatively thin cables (such as drop cables) entering the closure via an upper region 42 of the cable organizer 34.

Referring now to FIGS. 3-44, a fiber management organizer (or organizer) 100 in accordance with the present disclosure will be described. The cable organizer 100 can cooperate with housing pieces of a closure such as the closure 10 described above. For example, the cable organizer 100 can cooperate with the housing pieces 30, 32 as described above with respect to FIGS. 1 and 2. The organizer 100 can be positioned in the closure volume 40 (FIGS. 1-2).

The organizer 100 extends along a longitudinal axis 102 from a distal end 103 to a proximal end 104, along a transverse axis 106 from a first side 108 to a second side 110, and along a vertical axis 112 from a top 114 to a bottom 116. The axes 102, 106 and 112 are mutually perpendicular, with the axes 102 and 106 defining a horizontal plane.

The organizer 100 includes a main body 120, a basket 122, and fiber management trays 124. The basket 122 lockingly and releasably couples to the main body 120. The basket 122 locks to the main body in a fixed position.

In some examples, the main body 120 is a unitarily constructed, seamless part, e.g., made from a single mold of polymeric material.

The main body 120 includes a mounting portion 126 and a tray support structure 128.

The tray support structure 128 pivotally supports fiber management trays 124. Each tray 124 is pivotally coupled to the tray support structure 128 at a discrete mounting location defined by the fiber tray support structure 128, such that the trays 124 are stacked one atop another along the vertical axis. To access a tray 124 below another tray 124, the tray(s) 124 above it can be pivoted to a pivoted up position. Once work on the trays 124 is complete, the trays can be pivoted to the storage position, and the organizer 100 returned to the closure.

The tray support structure 128 of the main body 120 includes a tower 150. The tower 150 defines a longitudinal axis 152. When the main body 120 and the basket 122 are assembled, the axis 152 extends away from the horizontal surface 142 of the basket 122 at an angle 154. In some examples, the angle 154 is an oblique angle. In some examples, the angle 154 is in a range from about 100 degree to about 150 degrees. In some examples, the angle 154 is in a range from about 125 degrees to about 145 degrees. The tower 150 defines a plurality of hinge sockets 156 aligned with one another parallel to the axis 152.

Each socket 156 is configured to receive and pivotally retain a hinge pin 168 of a tray 124. Each socket is partially defined by an arm 170 having a projecting lip 172. To mount a tray 124 to the tower 150, the tray's hinge pin 168 is pressed downward in a selected one of the sockets 156 causing the distally corresponding arm 170 to flex distally. The pin 168 then clears the corresponding lip 172 and is snappingly received in the socket as the arm 170 resiliently returns to its unflexed position. In this position the corresponding lip 172 can help retain the pin 168 in the socket. Within the socket, the pin can rotate about a rotation axis lying in a horizontal plane. The sockets 156 including each socket's corresponding arm 170 and lip 172 are identically constructed.

The mounting portion 126 is configured to mount the main body 120 (and thereby the organizer 100) to a cable fixation base 70. Cables entering a closure can be fixed to a cable fixation base positioned within the interior volume of the closure. Optical fibers are routed from the cables on the organizer 100. The fibers can be routed to different portions of the organizer 100 depending on specific connectivity needs between provider side cables (e.g., feeder cables) and subscriber side cables (e.g., drop cables), as well as between different branch cables, or between feeder cables and branch cables. Branch cables typically can be used to route optical fibers between different closures. Fibers from a single feeder cable can be routed to multiple drop cables at a closure.

The organizer 100 includes structures for organizing optical fibers. For example, the trays 124 are configured to support fiber management components, such as optical signal splitters, wave division multiplexers, adapters that are configured to receive and optically connect connectorized fibers, and splice holders. Splice holders, such as the splice holders 125 mounted to the fiber management surface 127 of each tray 124, typically include a body defining slots configured to secure splice bodies that protect splices (e.g., mechanical splices, fusion splices) between fibers (e.g., between a feeder cable fiber and a drop cable fiber). Optionally, one or more of the trays 124 can be fitted with a protective cover 129 that covers the fiber management surface 127 of the tray and is configured to protect the fibers managed on the fiber management surface 127.

Fibers can be routed from the cables to the basket 122. The basket 122 includes a bottom wall 130, and sidewalls 132, 134, 136 that, together with the bottom wall 130, define an interior basket volume 138. Loops and portions of loops of optical fibers can be stored in the interior basket volume 138. In addition, axial lengths of optical fibers can be routed through the basket volume 138 for improved routing and alignment of the fibers at the trays 124. Stored fibers can be stored in the basket volume 138 until optical connectorization of those fibers is needed. Lengths of fibers that enter and exit the closure via cables without being managed on the fiber management trays 124 can also be positioned in the basket volume 138.

The fibers stored in, and/or routed through the basket volume 138, can be loose, ribbonized, and/or positioned in protective sheaths (e.g., plastic tubes) holding a single fiber or a group of fibers.

The number and volume or collection of fibers positioned in the basket 122 can vary based on the connectivity needs at a given closure. In addition, a different sized basket (e.g., one having a basket volume that can accommodate more or fewer fibers than the basket 122) can be used and coupled to the same main body 120.

To protect the collection of fiber lengths positioned in the basket volume 138 from tangling with fibers external to the basket, as well as from twisting of fibers, from catching of fibers on portions of the organizer, and/or from fibers experiencing undesirable load forces, it is preferable to physically retain the collection of fiber lengths within the basket 122.

The basket 122 includes tabs 140 projecting horizontally from upper portions of the sidewalls 132, 134, 136 and parallel to the fiber surface 142 of the bottom wall 130.

A further basket optical fiber retainer (or, retainer) 200 is illustrated. The retainer 200 is configured to be lockingly mounted to the tower 150 at any of multiple mounting locations defined by the tower 150. Specifically, each socket 156 defines a mounting location for lockingly mounting the retainer 200. Typically, the retainer 200 is mounted to the socket 156, and trays 124 are pivotally mounted to one or more of the sockets above the retainer 200.

Referring now to FIGS. 8-16, main body 120 is shown mounted to basket 122. A mounting arrangement 250 connects the basket 122 and main body 120. In one example embodiment, the mounting arrangement 250 includes a snap 252 and one or more plates 260, 261. Plates 260, 261 are positioned on opposite sides of basket 122. Snap 252 is received in a socket 264 of basket 122. Snap 252 is preferably symmetrical top to bottom as shown in FIG. 16.

In some examples, basket 122 can be removed from main body 120, by pressing inwardly on snap arms 254 to remove them from shoulders 256 of socket 264. Snap arms 254 can be accessed through openings 266 in socket 264.

Plates 260, 261 can offer stability to the snap feature of snap 252. A further alignment notch 267 in plate 261 mates with tab 268 of basket 122 for further security and stability.

Basket 122 can be selected from a set of baskets with different sizes (length, or width, or height, or with different configurations for the user to easily customize the organizer.

Figure 8:
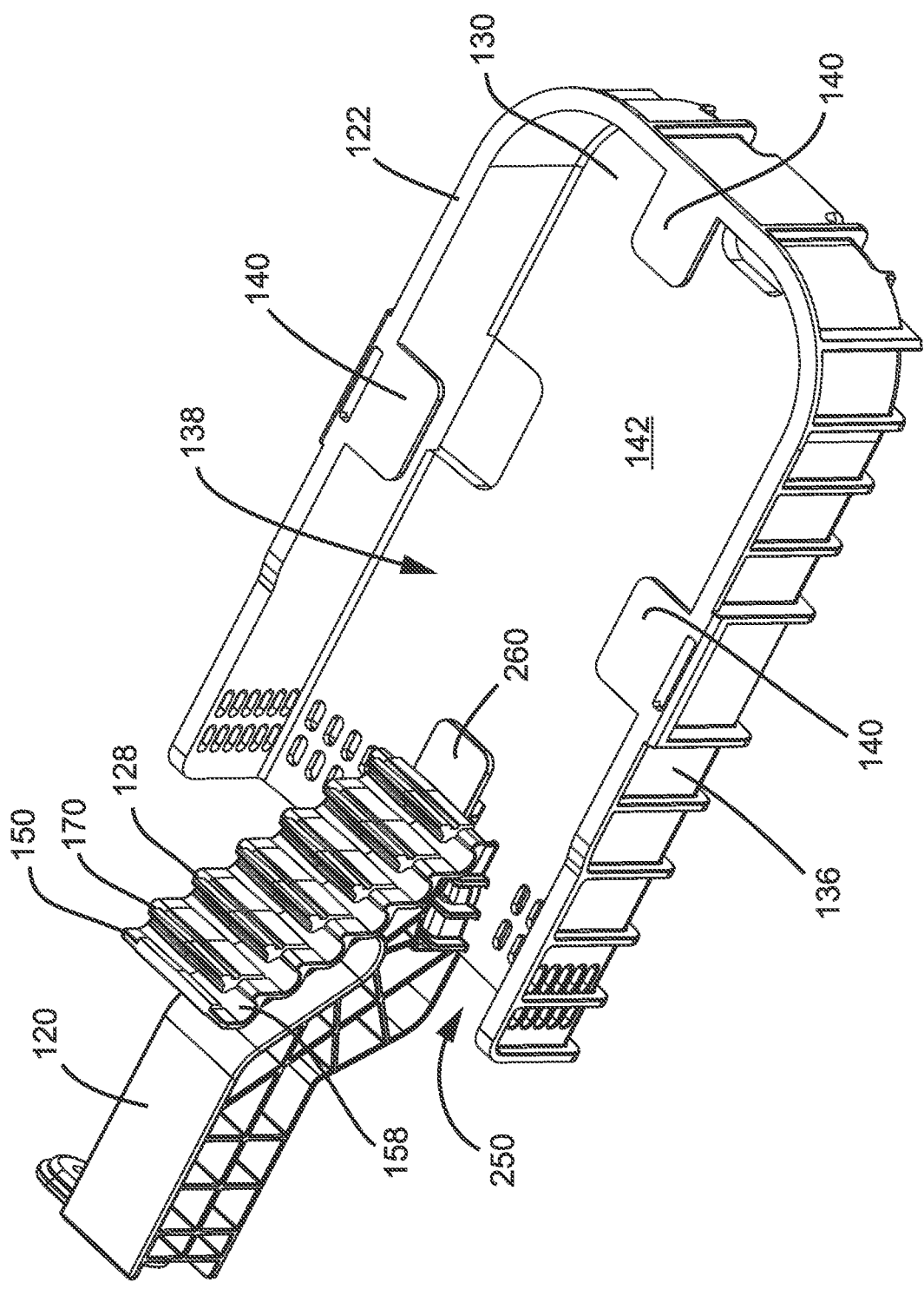
FIG. 8 shows the organizer of FIGS. 3-7, without the rotating trays.
Figure 9:
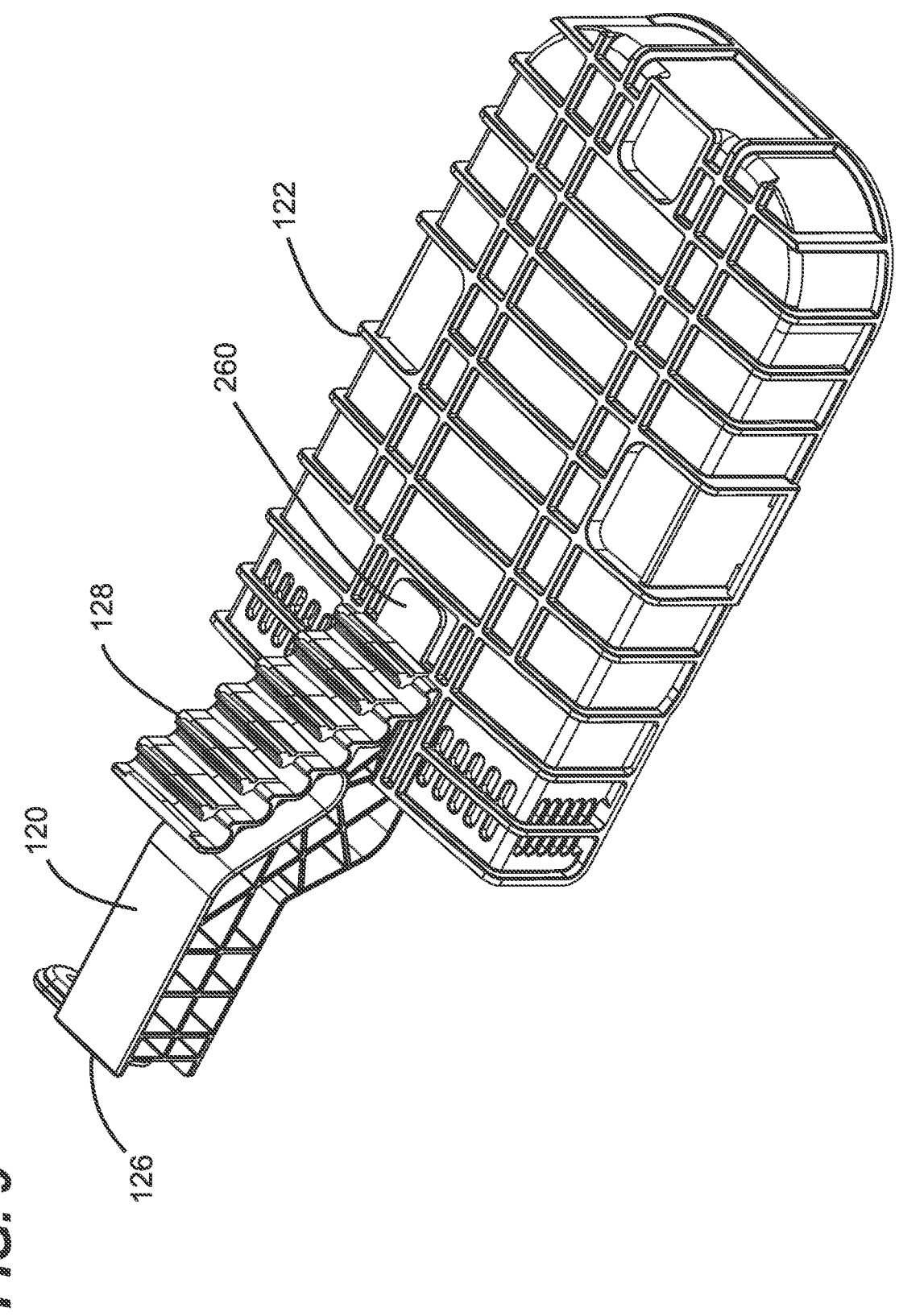
FIG. 9 shows the organizer of FIG. 7, wherein the basket is mounted in an opposite facing direction from the direction faced in FIG. 8.
Figure 10:
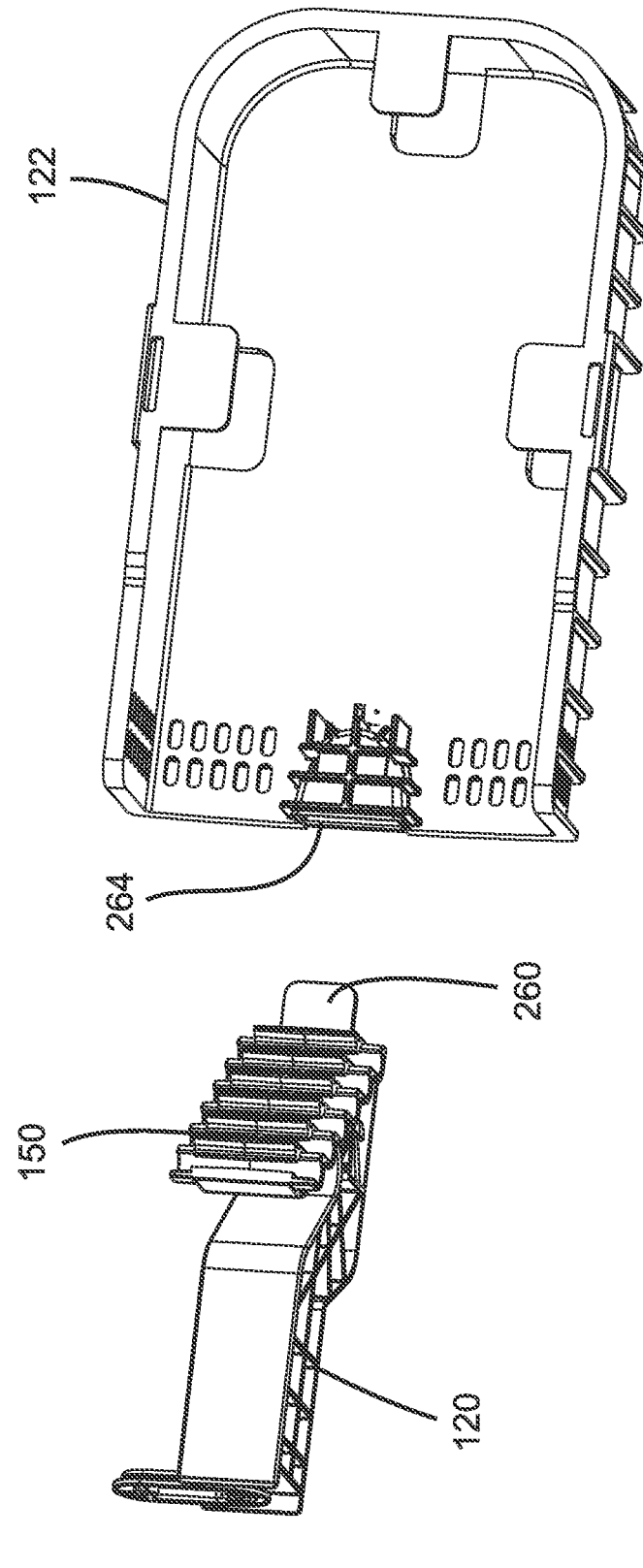
FIG. 10 is an exploded perspective view of the organizer of FIG. 8.
Figure 11:
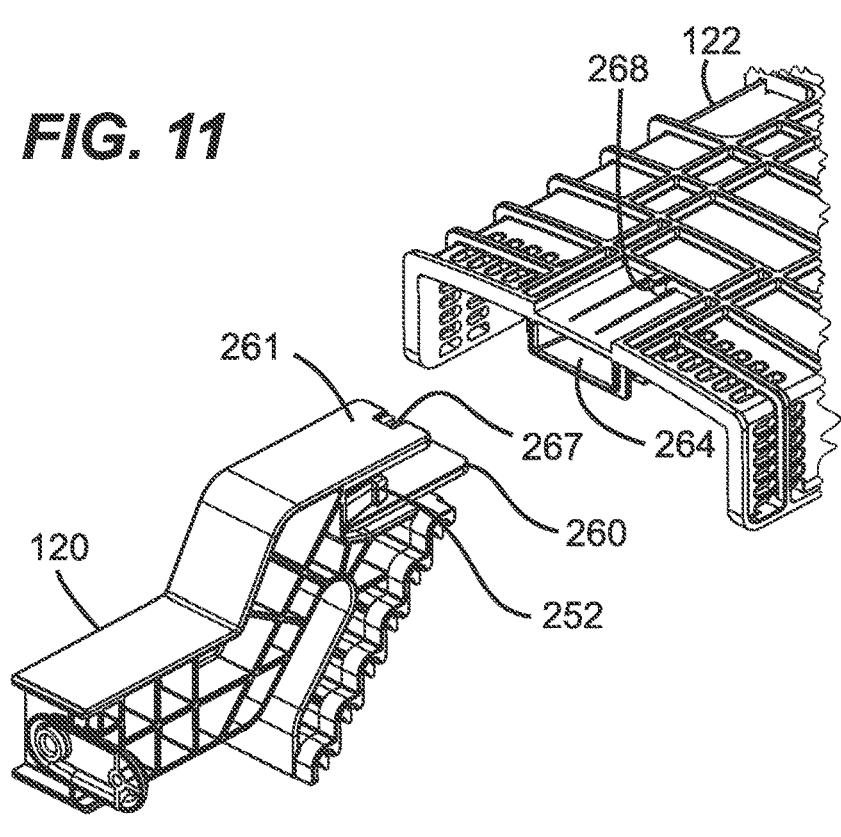
FIG. 11 is a further exploded perspective view of the organizer of FIG. 8.
Figure 12:
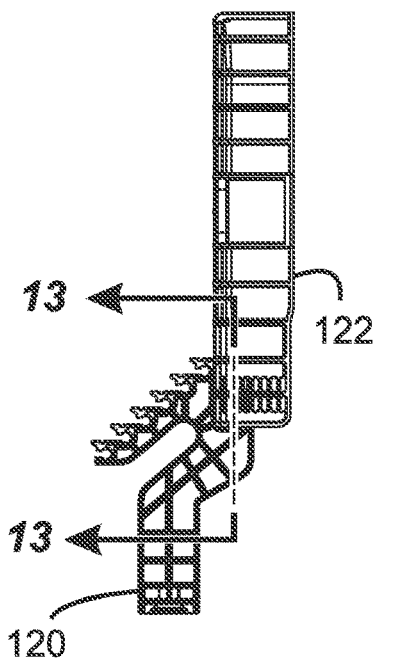
FIG. 12 is a side view of the organizer of FIG. 9.
Figure 13:
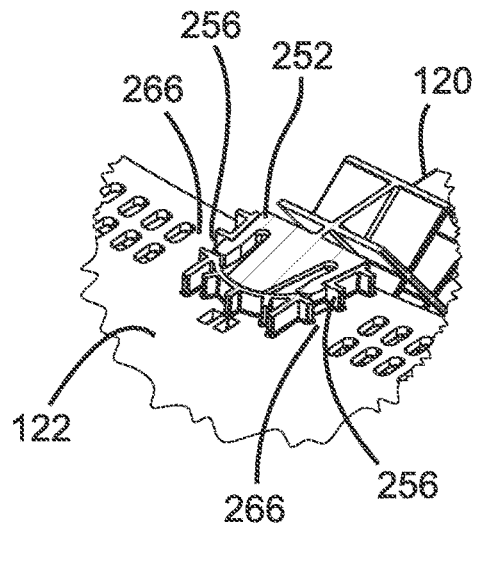
FIG. 13 is a cross-sectional perspective view of a snap feature between the main body and the basket of the organizer of FIG. 12, taken along lines 13-13.
Figure 17:
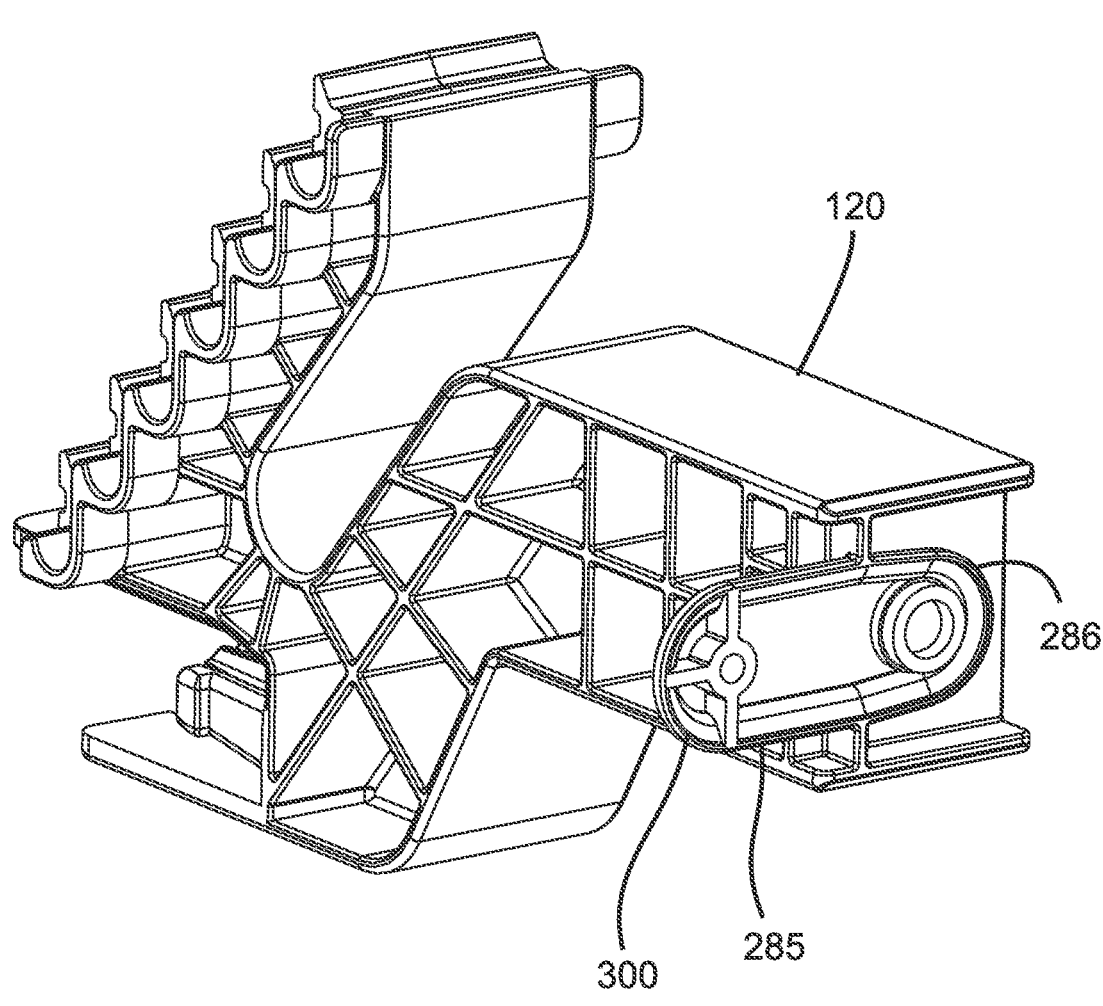
FIG. 17 is bottom perspective view of the main body.

Basket 122 in some cases can be mounted in a reverse position from the position of FIG. 8, as shown in FIG. 9. In some situations, an oppositely facing fiber storage basket is desired for storing fiber loops.

The mounting arrangement 250 allows for different baskets 122 to be used with main body 120, different main bodies 120 to be used with basket 122, as desired by the user. Repair and upgrades of the basket 122 or main body 120 can also be easily accomplished.

Referring now to FIGS. 17-24, main body 120 mounts to a base 70 with a snap fit feature 280 includes a spring plunger 282 in the form of a spring loaded ball 284. Main body 120 also includes a projection 285 with an edge 286 partially surrounding spring plunger 282. Base 70 includes a shoulder 290 and a hole 292. Shoulder 290 receives edge 286 of main body 120. Hole 292 receives ball 284 of spring plunger 282 of main body 120.

Figure 21:
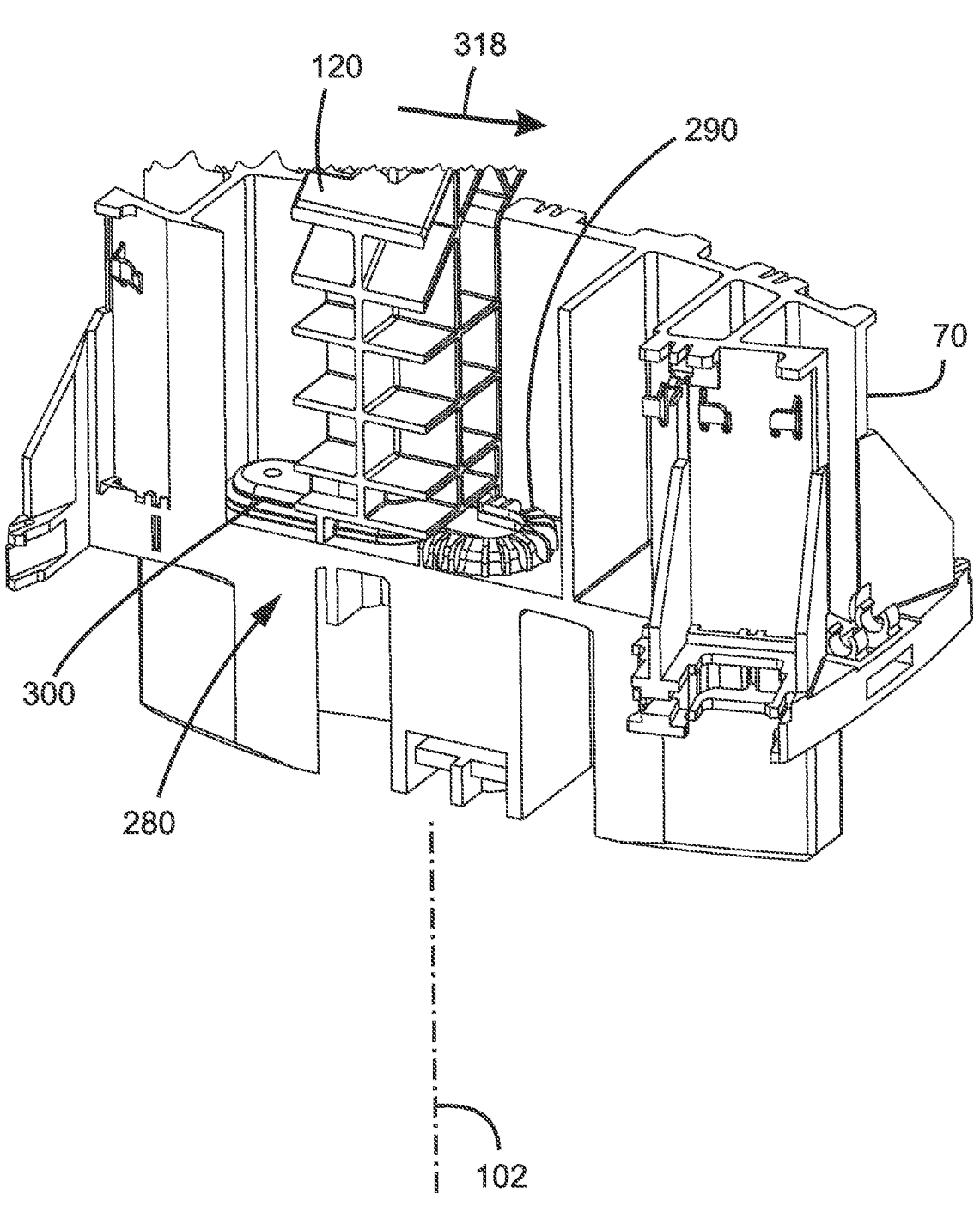
FIG. 21 shows the main body being mounted to the base with a sliding motion in s perpendicular direction relative to a longitudinal axis of the organizer.
Figure 25:
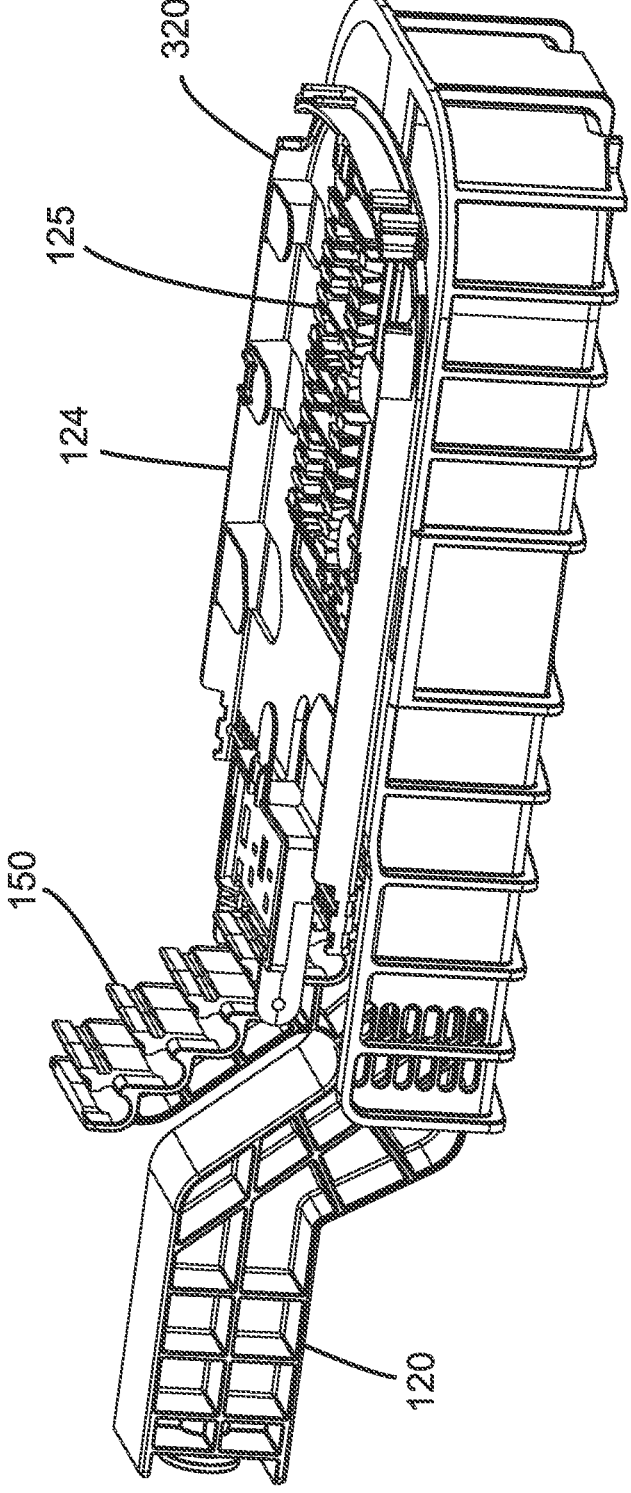
FIG. 25 is a perspective view of the organizer with a single rotatable tray shown.
Figure 26:
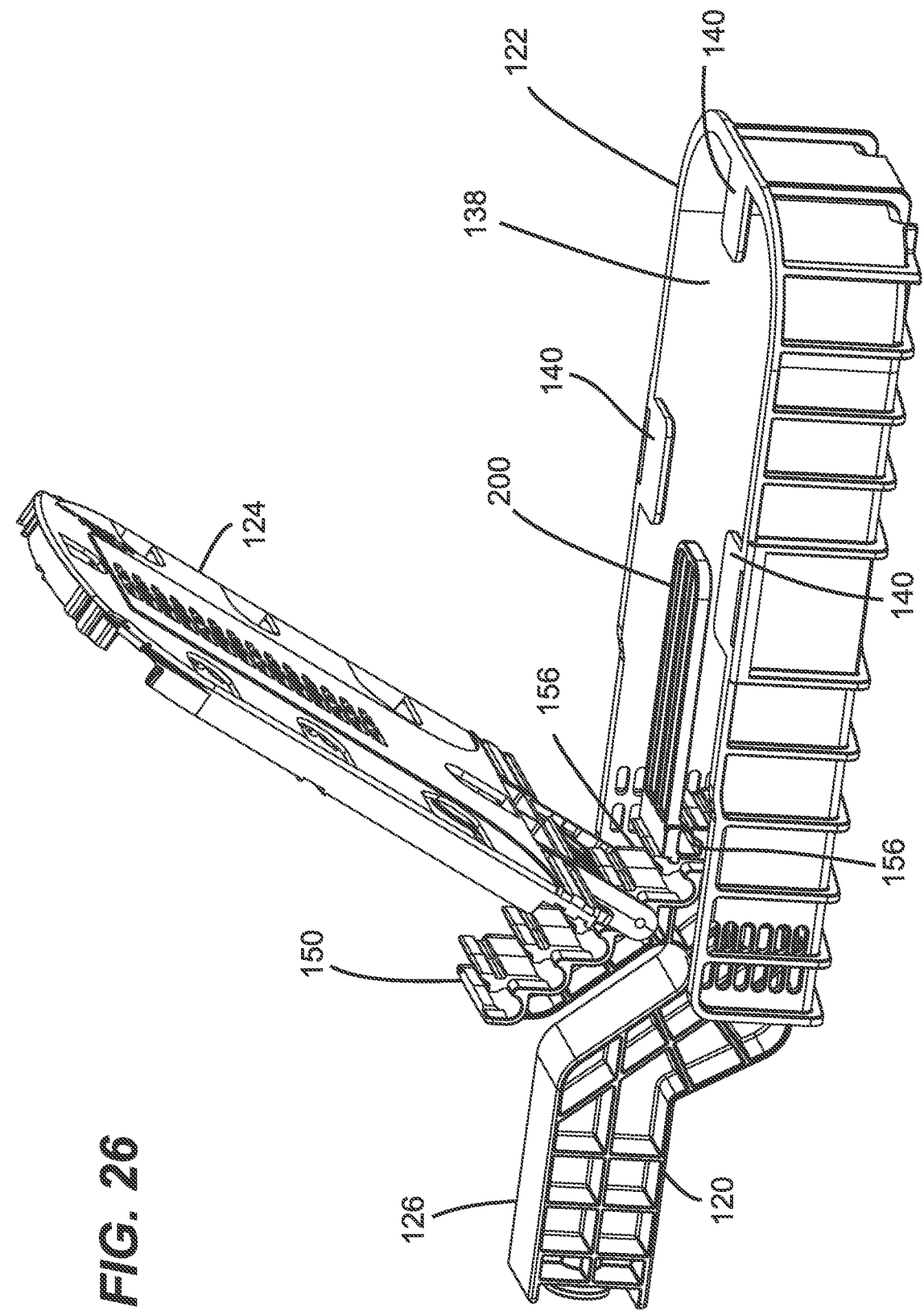
FIG. 26 shows the organizer and tray of FIG. 25, with the tray rotated to an access position and locked in position for accessing an area under the rotated tray.
Figures 27, 28:
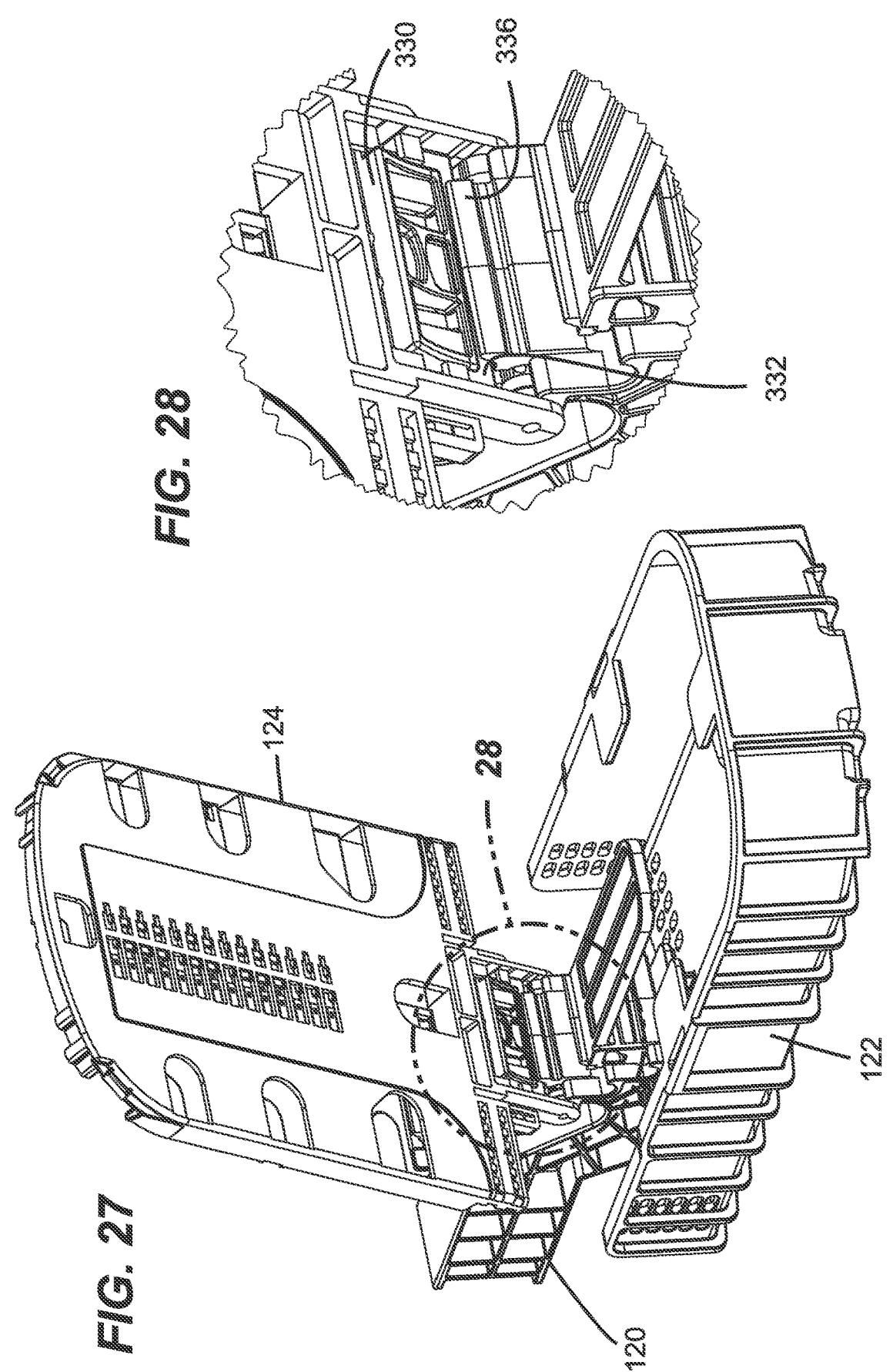
FIG. 27 is a further perspective view of the organizer and tray of FIG. 26.
FIG. 28 is an enlarged portion of FIG. 27 showing the tray locking feature.
Figure 29:
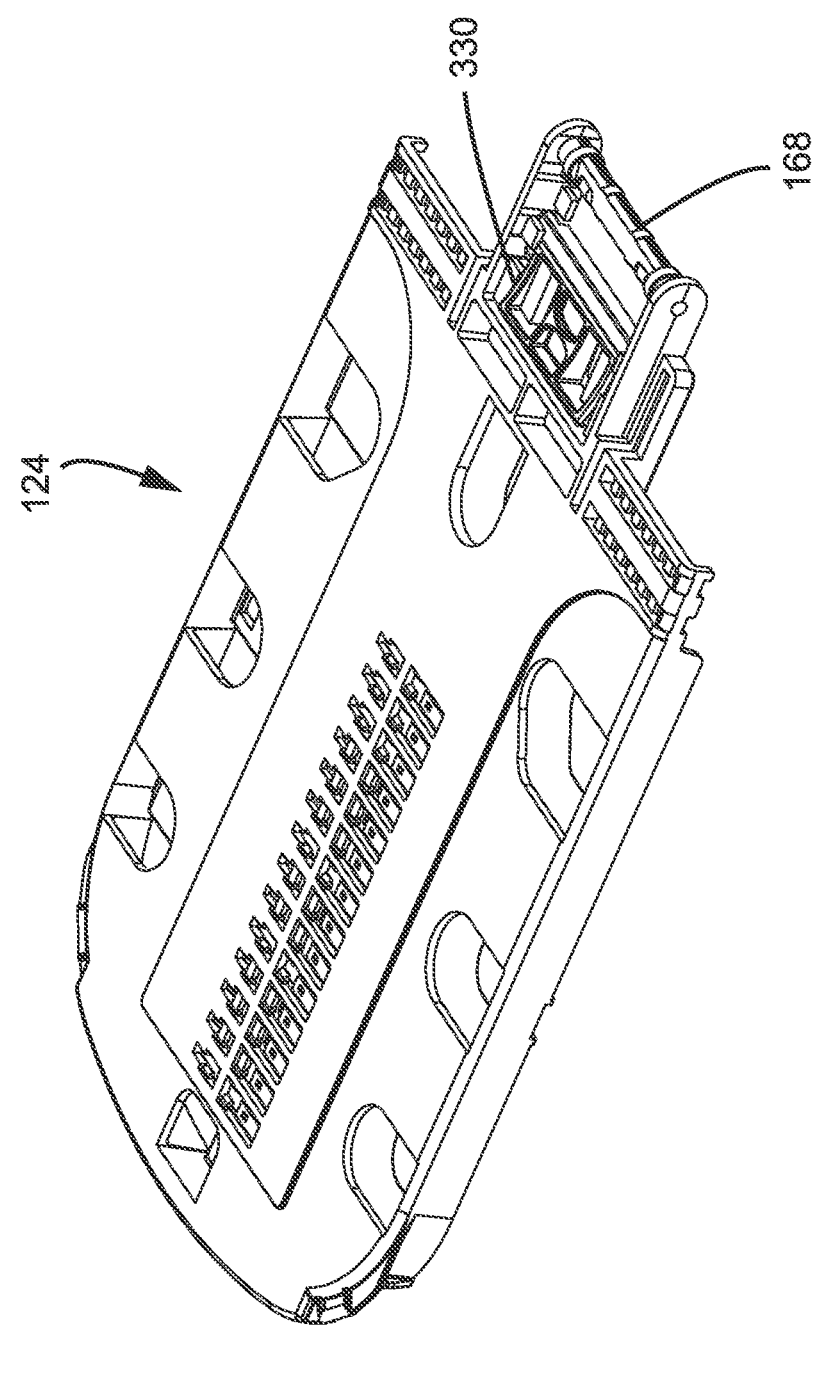
FIG. 29 is a perspective view of a tray.

To facilitate attachment, main body 120 is slid in a transverse direction 318 relative to the longitudinal axis 102 of main body 120 from a disengaged position as shown in FIG. 21, to an engaged position as shown in FIGS. 22-24.

Base 70 can include an alignment trough 296 with a ramp 298 for receiving spring plunger 282 during alignment and before engagement. Once fully slid and fully engaged, ball 284 is positioned in hole 292, and edge 286 is positioned under shoulder 290. Shoulder is defining a 180 degree coverage over edge 286, and has a U-shape.

If desired, projection 285 can include an arm 300 with a hole 302 for receipt of a fastener (not shown) which is received in opening 304 of base 70.

Referring now to FIGS. 25-44, each tray 124 includes a hinge pin 168 for hingeably mounting to tower 150. Each tray 124 includes a tray body portion 320 for holding fiber optic cable, and components, including splices, splitters, connectors and adapters, or other. Tray 124 includes a locking element 330 slidable between two positions an unlocked position as shown in FIGS. 29, 30, and 33-38, and a locked position as shown in FIGS. 27, 28, and 39-44.

In the unlocked position, tray 124 is freely rotatable relative to tower 150. When it is desired to rotate tray 124 away from lower elements, such as lower trays or the tray basket, it is desired to maintain tray 124 in a rotated position. Locking element 330 is slidable from the position shown in FIGS. 29, 30, and 33-38, to the position shown in FIGS. 27, 28, and 39-44 wherein an edge 332 is positioned behind a lip 336 of tower 220 which prevents tray 124 from rotating backwards.

Each tray 124 can be provided with a locking element 330 for holding each tray in a rotated position. In some examples, all of the trays of the trays above the lowest tray to be rotated can be rotated away from the lower structure, and all rotated trays can be held in position by fewer than all of the locking elements 330 of each tray being activated, such as only one.

Locking element 330 includes retaining tabs 340, 342 with ramped ends 344 to help maintain the selected position of locking element 330 in the locked position or in the rotatable position. Retaining tabs 340, 342 on locking element 330 cooperate with slots 346, 348 on tray body portion 320, along with an intermediate ramp 350 to hold locking element 330 is the selected position. Compare FIGS. 38 and 44. The user can slide the one or more locking elements 330 in a direction of a tray longitudinal axis, toward or away from hinge pin 168 to lock or unlock each tray 124, as desired.

Locking element 330 is retained with tray body portion 320 in a constrained sliding manner in a pocket 360. Edge tabs 362, 364 and a gap 366 of locking element 330 are intermated with tabs 370, 372, gap 374, and base 378 of pocket 360 by dropping locking element 330 downward and sliding locking element 330 away from hinge pin 168. Locking element 330 is retained for constrained sliding movement by a flexible tab 380 with a shoulder 382 on tray body portion 320 engaged in an elongated slot 390 on locking element 330. Compare FIGS. 37 and 43.

Figure 30:
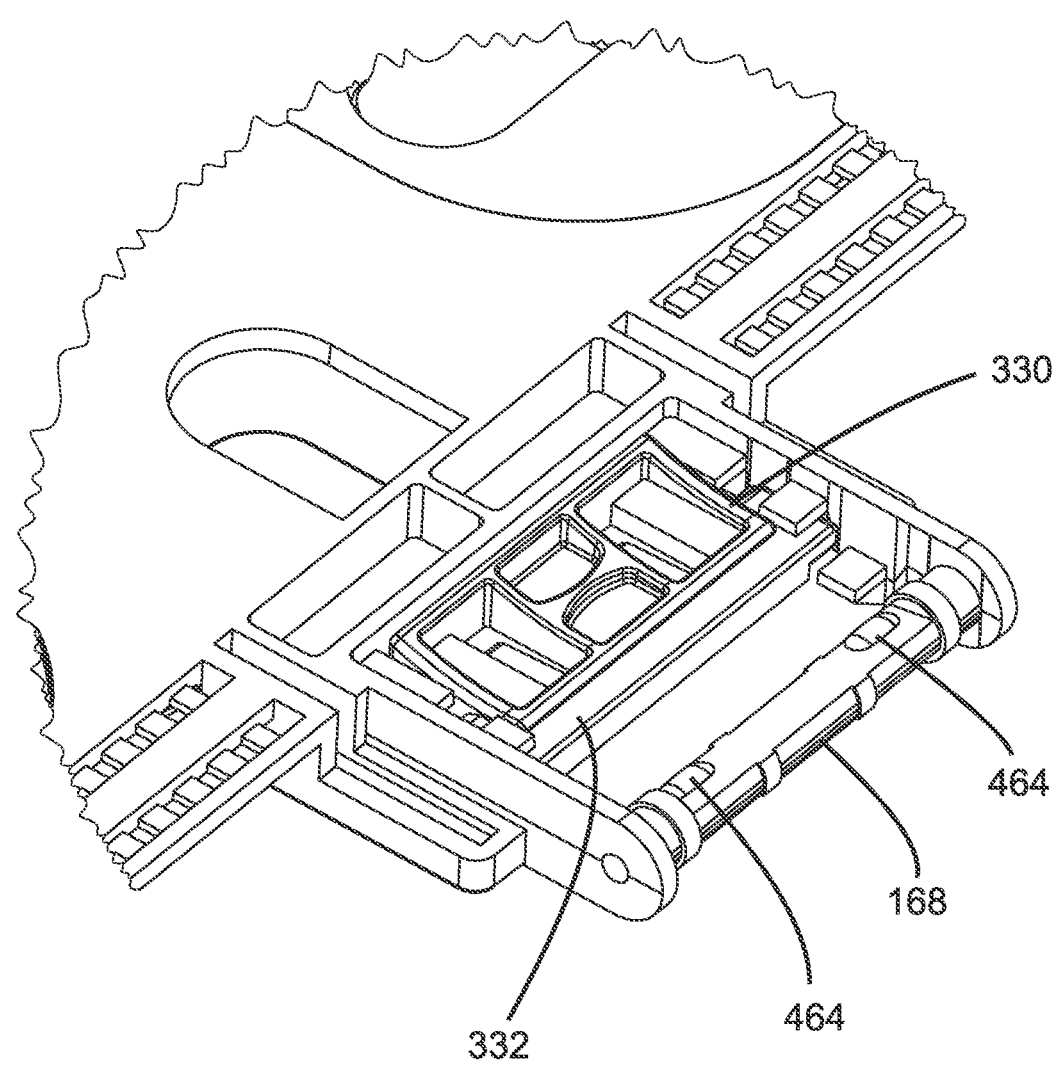
FIG. 30 is an enlarged view of the locking feature of the tray.
Figure 30A:
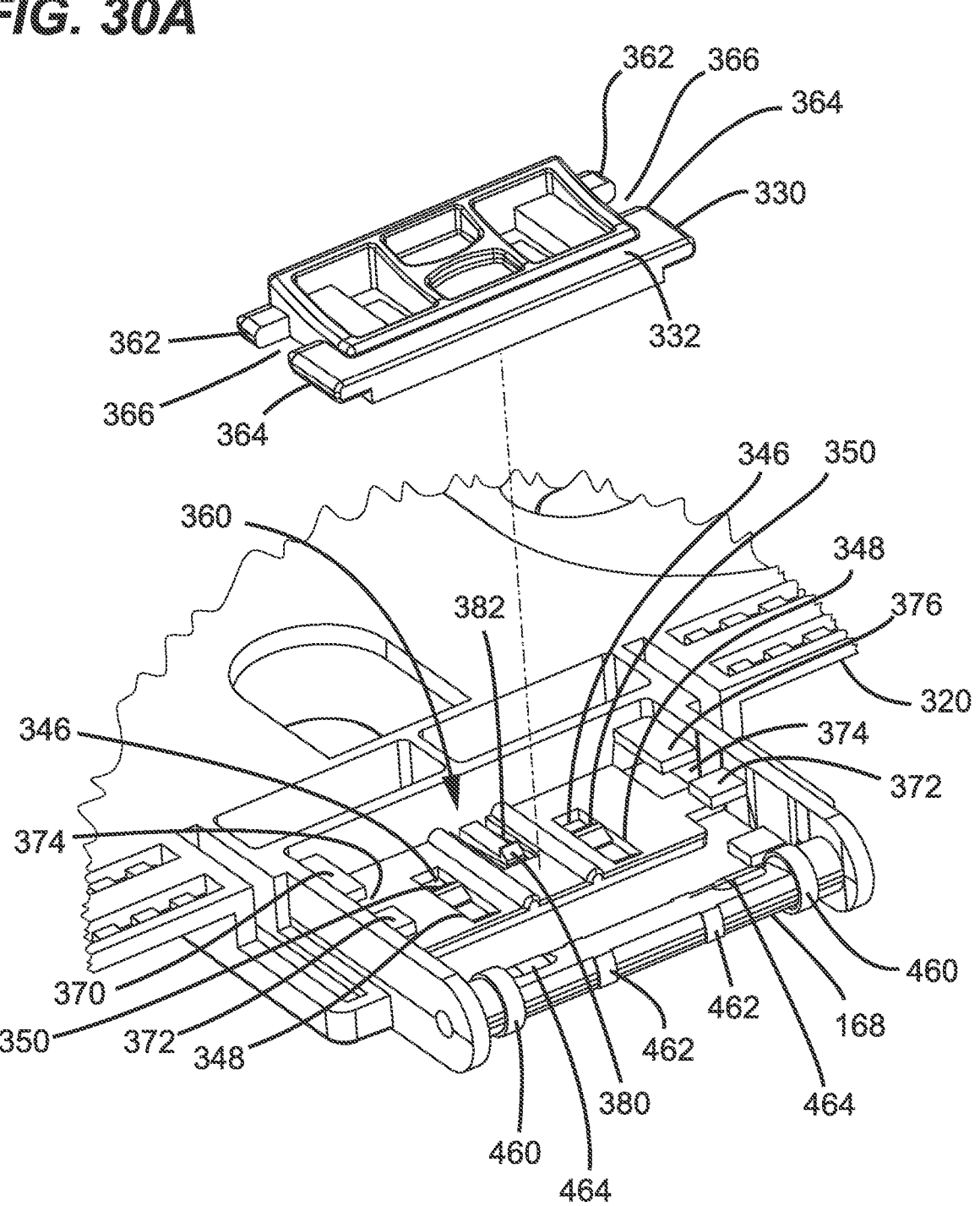
FIG. 30A is an exploded view of FIG. 30.
Figure 31:
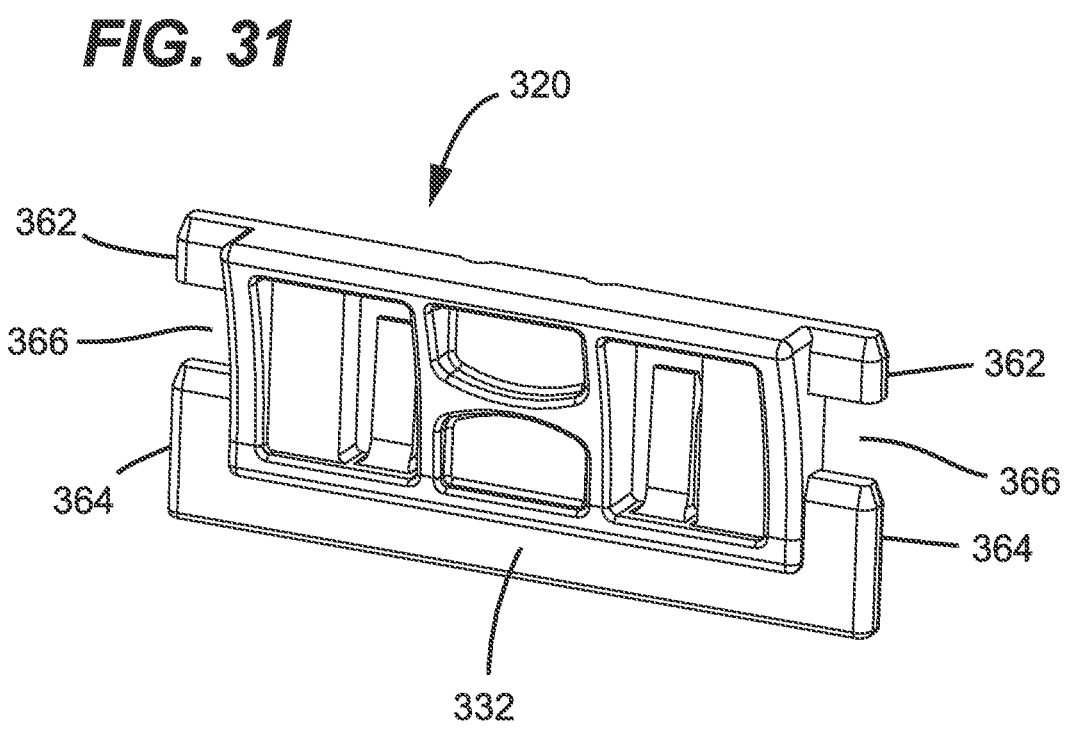
FIG. 31 is a first perspective view of a tray locking element of the tray shown in FIG. 30.
Figure 32:
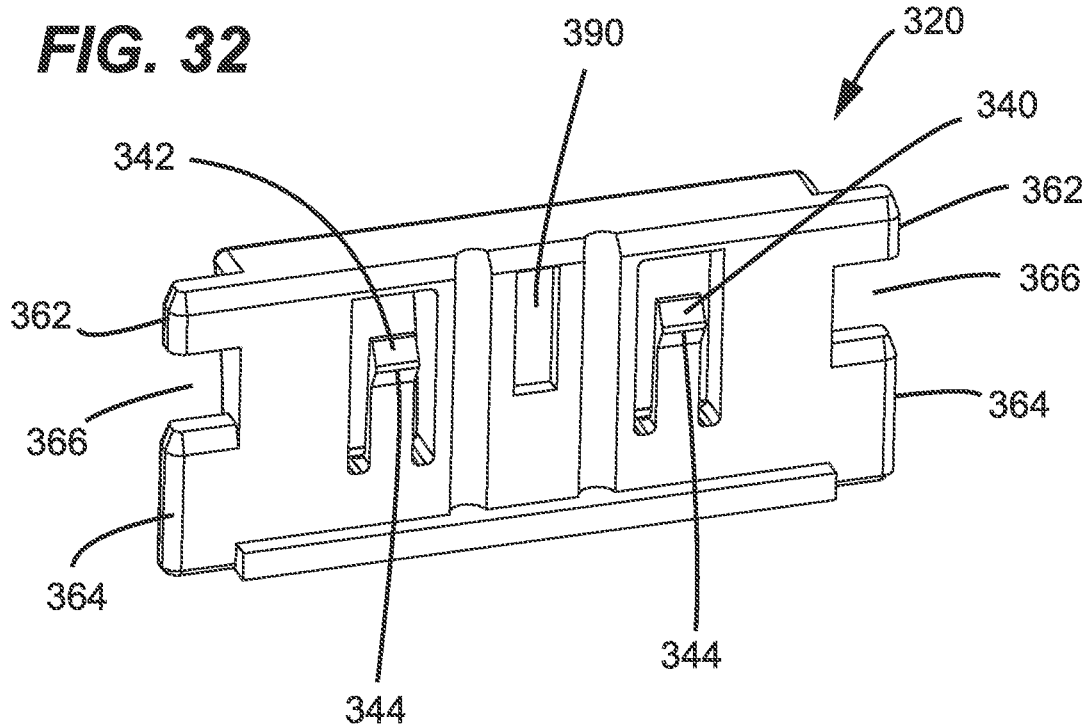
FIG. 32 is a second perspective view of the tray locking element of FIG. 31.
Figure 36:
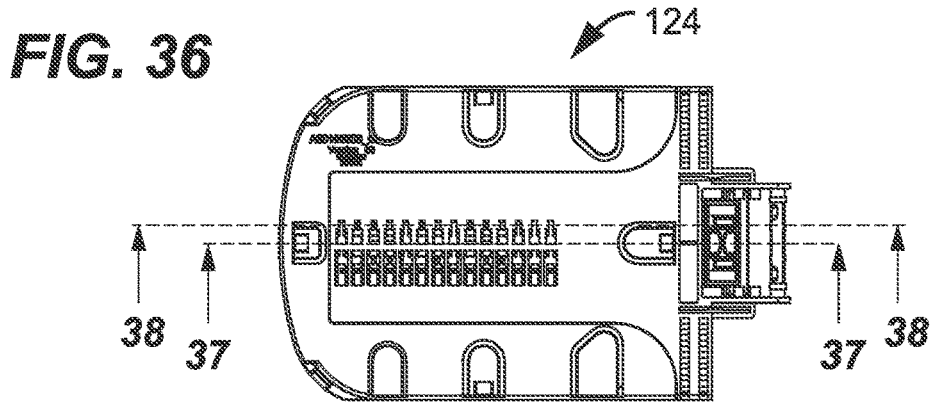
Figure 37:
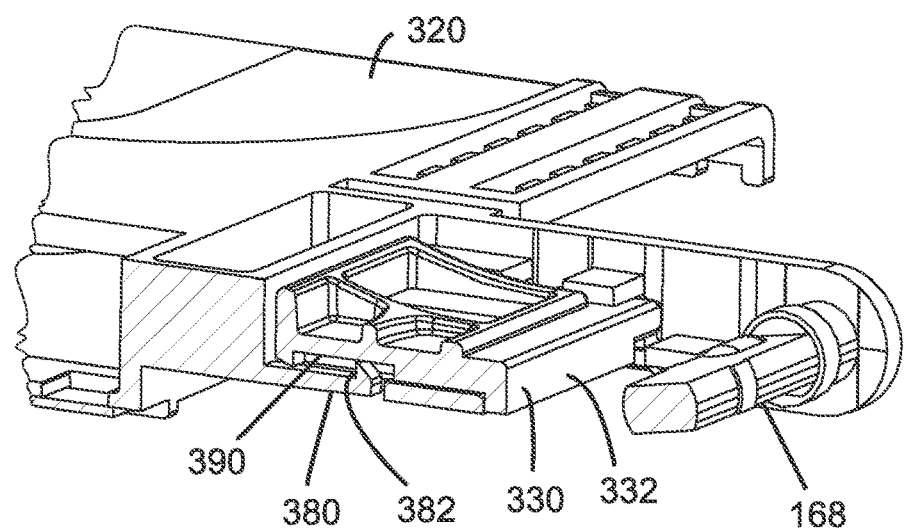
Figure 38:
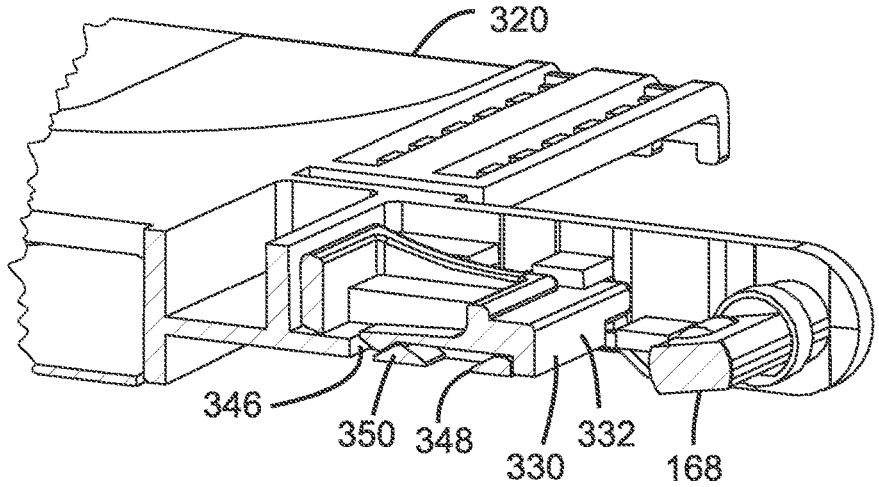
Figures 39, 40, 41:
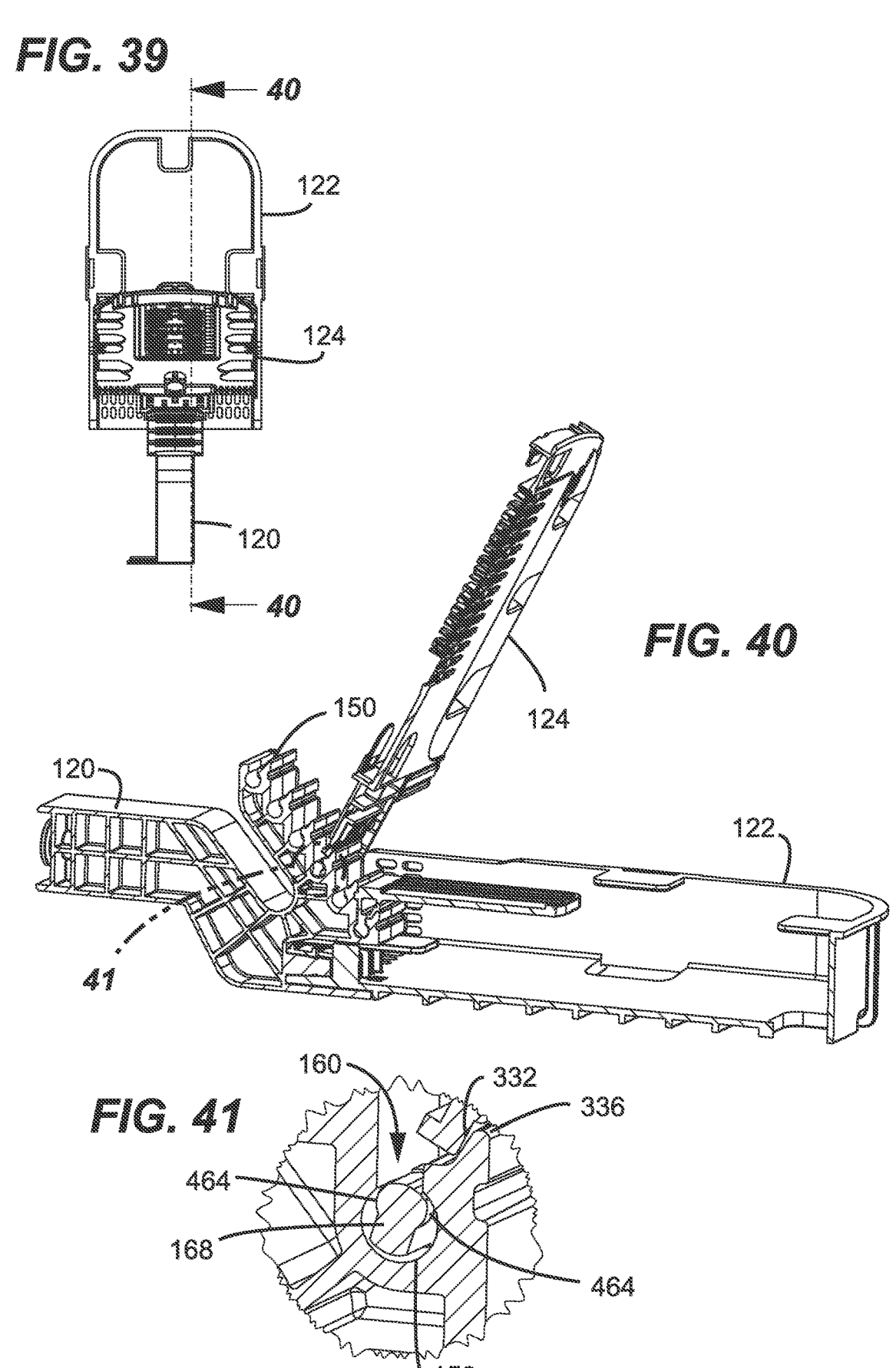

Referring now to FIGS. 30, 35 and 41, each hinge pin 168 of tray 124 includes a rounded portion 460 on each end of pin 168, and intermediate rounded portions 461. Rounded portions 460, 462 define hinge bearing surfaces against surface 158 of each socket 155 for smooth rotation of each tray 124. Pin 168 further includes retention bumps 464 on each side of pin 168. See FIG. 41. Bumps 464 help retain pin 168 in the socket 156 of tower 150. Bumps 464 do not unduly restrict the snapping of tray 124 into the socket 156 through opening 160 during assembly, or the removal of the tray at a later time. Between rounded portions 460, 462, hinge pin 168 is generally rectangular to facilitate snap mounting to tower 150. Retention bumps 464 help retain tray 124 in the socket 156 in a secure manner, and are located in an area near an upper part of the hinge pin 156 to prevent any excessive looseness when in the position of FIG. 41.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber management organizer, comprising:
a main body, a fiber storage basket and fiber management trays, wherein the main body is configured for rotatably holding the fiber management trays, wherein the fiber management trays and the main body include a locking feature for holding one or more of the fiber management trays in a rotated position away from lower structure of the organizer including further of the fiber management trays, a basket, or other structure, wherein the locking feature includes a slide member configured to slide within a pocket of one of the fiber management trays.

2. The fiber management organizer of claim 1, wherein the fiber management trays are stacked on top of one another along a vertical axis.

3. The fiber management organizer of claim 1, wherein the fiber management trays are mounted to an angled tower at an oblique angle.

4. The fiber management organizer of claim 1, wherein the fiber storage basket includes a bottom wall and sidewalls that, together with the bottom wall, define an interior basket volume.

5. The fiber management organizer of claim 1, wherein the fiber storage basket includes a plurality of tabs projecting horizontally from upper portions of the side walls and parallel to a fiber surface of the bottom wall.

6. The fiber management organizer of claim 1, wherein the main body is slid in a transverse direction relative to a longitudinal axis of the main body from a disengaged position of the main body with respect to a base to an engaged position of the main body with respect to the base.

7. The fiber management organizer of claim 6, wherein the base includes an alignment trough with a ramp for receiving a spring plunger during alignment and before engagement.

8. The fiber management organizer of claim 7, wherein a ball is positioned in a hole, and an edge is positioned under a shoulder.

9. The fiber management organizer of claim 7, wherein a fastener can be received in an opening of the base through an arm.

10. The fiber management organizer of claim 1, wherein the slide member includes retaining tabs with ramped ends to maintain the slide member in a locked position or in a rotatable position.

11. The fiber management organizer of claim 10, wherein each hinge pin of each fiber management tray includes a rounded portion on each end of the hinge pin, and an intermediate rounded portion.

12. The fiber management organizer of claim 11, wherein each hinge pin of each fiber management tray further includes retention bumps on each side of the hinge pin.

13. The fiber management organizer of claim 1, wherein the fiber storage basket is mountable to the main body with a snap feature.

14. The fiber management organizer of claim 13, wherein the fiber storage basket is mountable in two positions, a forward position, and an oppositely facing reverse position.

15. The fiber management organizer of claim 1, further comprising a base of a closure, wherein the main body mounts to the base of the closure with a snap feature.

16. The fiber management organizer of claim 15, wherein the snap feature includes a spring-loaded plunger, and a slidable engagement feature including a surrounding lip.

17. A fiber management organizer, comprising:
a base of a closure;
a main body;
a fiber storage basket; and
fiber management trays,
wherein the main body is configured for rotatably holding the fiber management trays;
wherein the fiber management trays and the main body include a locking feature for holding one or more of the fiber management trays in a rotated position away from lower structure of the organizer including further of the fiber management trays, a basket, or other structure;
wherein the locking feature includes a slide member;
wherein the main body is slid in a transverse direction relative to a longitudinal axis of the main body from a disengaged position of the main body with respect to the base to an engaged position of the main body with respect to the base; and
wherein the base includes an alignment trough with a ramp for receiving a spring plunger during alignment and before engagement.

18. The fiber management organizer of claim 17, wherein a ball is positioned in a hole, and an edge is positioned under a shoulder.

19. The fiber management organizer of claim 17, wherein a fastener can be received in an opening of the base through an arm.

20. A fiber management organizer, comprising:

a base;

a main body;

a fiber storage basket; and fiber management trays, wherein the main body is configured for rotatably holding the fiber management trays;

wherein the fiber management trays and the main body include a locking feature for holding one or more of the fiber management trays in a rotated position away from lower structure of the organizer including further of the fiber management trays, a basket, or other structure;

wherein the locking feature includes a slide member;

wherein the main body mounts to the base of the closure with a snap feature; and wherein the snap feature includes a spring-loaded plunger, and a slidable engagement feature including a surrounding lip.

\* \* \* \* \*